US009618616B2

(12) United States Patent
Kishigami et al.

(10) Patent No.: US 9,618,616 B2
(45) Date of Patent: Apr. 11, 2017

(54) RADAR APPARATUS

(71) Applicant: Panasonic Corporation, Osaka (JP)

(72) Inventors: Takaaki Kishigami, Tokyo (JP); Hirofumi Nishimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 271 days.

(21) Appl. No.: 14/630,105

(22) Filed: Feb. 24, 2015

(65) Prior Publication Data

US 2015/0247924 A1    Sep. 3, 2015

(30) Foreign Application Priority Data

Feb. 28, 2014 (JP) ................................. 2014-039918
Nov. 12, 2014 (JP) ................................. 2014-229394

(51) Int. Cl.
*G01S 13/93* (2006.01)
*G01S 7/40* (2006.01)
(Continued)

(52) U.S. Cl.
CPC .......... *G01S 13/931* (2013.01); *G01S 7/2923* (2013.01); *G01S 7/40* (2013.01); *G01S 7/4026* (2013.01); *G01S 7/411* (2013.01); *G01S 7/414* (2013.01); *G01S 7/415* (2013.01); *G01S 13/26* (2013.01); *G01S 13/325* (2013.01); *G01S 13/343* (2013.01); *G01S 13/582* (2013.01); *G01S 7/2813* (2013.01); *G01S 7/292* (2013.01); *G01S 7/354* (2013.01); *G01S 13/93* (2013.01);

(Continued)

(58) Field of Classification Search
CPC ...... G01S 13/93; G01S 13/931; G01S 5/0252; G01S 7/292; G01S 7/2922; G01S 7/2927; G01S 7/354; G01S 7/40; G01S 7/4026; G01S 2007/403; G01S 2007/4034
USPC ....................................................... 342/70–72
See application file for complete search history.

(56) References Cited

U.S. PATENT DOCUMENTS 5,999,120 A    12/1999  Yamada
6,020,844 A *   2/2000  Bai ....................... G01S 7/4026
                                                                    342/147

(Continued)

FOREIGN PATENT DOCUMENTS

JP     11-326491    11/1999
JP     2001-166029   6/2001
WO    2005/124388   12/2005

*Primary Examiner* — Peter Bythrow
(74) *Attorney, Agent, or Firm* — Seed IP Law Group LLP

(57) ABSTRACT

Each of antenna system processors of a radar receiver generates, through correlation calculation of a reflection signal and a radar transmission signal, an array correlation signal for each delay in arrival of the reflection signal at each Doppler frequency. A static target candidate extractor extracts, on the basis of outputs of the antenna system processors and a Doppler frequency of a reflection signal from a static target located at a side of a moving body, array correlation signals corresponding to a candidate for the static target. A reference signal detector outputs a reference signal regarding the side of the moving body using, among the outputs of the static target candidate extractor, array correlation signals whose consistency is high. A correction value calculator calculates, using outputs of the reference signal detector, a correction value for correcting deviations between reception antennas included in an array antenna.

10 Claims, 11 Drawing Sheets

(51) Int. Cl.
*G01S 7/35* (2006.01)
*G01S 7/41* (2006.01)
*G01S 13/26* (2006.01)
*G01S 13/32* (2006.01)
*G01S 13/34* (2006.01)
*G01S 13/58* (2006.01)
G01S 7/292 (2006.01)
G01S 7/28 (2006.01)
G01S 7/288 (2006.01)

(52) U.S. Cl.
CPC ............... *G01S 2007/2886* (2013.01); *G01S 2013/9375* (2013.01); *G01S 2013/9385* (2013.01)

(56) References Cited

U.S. PATENT DOCUMENTS

| | | | | |
|---|---|---|---|---|
| 6,119,067 | A * | 9/2000 | Kikuchi | G01S 7/4026 342/158 |
| 6,246,949 | B1 * | 6/2001 | Shirai | B60K 31/0008 342/70 |
| 7,545,313 | B2 * | 6/2009 | Okamura | G01S 7/4026 342/173 |
| 9,411,035 | B2 * | 8/2016 | Tsai | G01S 3/74 |
| 9,527,509 | B2 * | 12/2016 | Kwon | B60W 30/16 |
| 2004/0017308 | A1 * | 1/2004 | Kikuchi | G01S 7/4026 342/74 |
| 2004/0066325 | A1 * | 4/2004 | Zoratti | G01S 7/4026 342/165 |
| 2004/0117090 | A1 * | 6/2004 | Samukawa | B60K 31/0008 701/45 |
| 2004/0217899 | A1 * | 11/2004 | Kikuchi | G01S 7/4026 342/75 |
| 2005/0017891 | A1 * | 1/2005 | Kuroda | G01S 7/4026 342/70 |
| 2005/0024261 | A1 * | 2/2005 | Fujita | G01S 7/4026 342/174 |
| 2005/0285778 | A1 * | 12/2005 | Shinagawa | G01S 7/4026 342/173 |
| 2007/0052581 | A1 | 3/2007 | Shima | |
| 2007/0115169 | A1 * | 5/2007 | Kai | G01S 7/4026 342/174 |
| 2008/0012752 | A1 * | 1/2008 | Okamura | G01S 7/4026 342/165 |
| 2009/0153395 | A1 * | 6/2009 | Morinaga | G01S 5/04 342/175 |
| 2011/0068970 | A1 * | 3/2011 | Mitsumoto | G01S 7/4026 342/70 |
| 2011/0080313 | A1 * | 4/2011 | Wintermantel | G01S 7/032 342/70 |
| 2012/0242531 | A1 * | 9/2012 | Itoh | G01S 7/4026 342/107 |
| 2013/0218398 | A1 * | 8/2013 | Gandhi | B60R 16/02 701/31.1 |
| 2015/0070207 | A1 * | 3/2015 | Millar | G01S 13/006 342/174 |

* cited by examiner

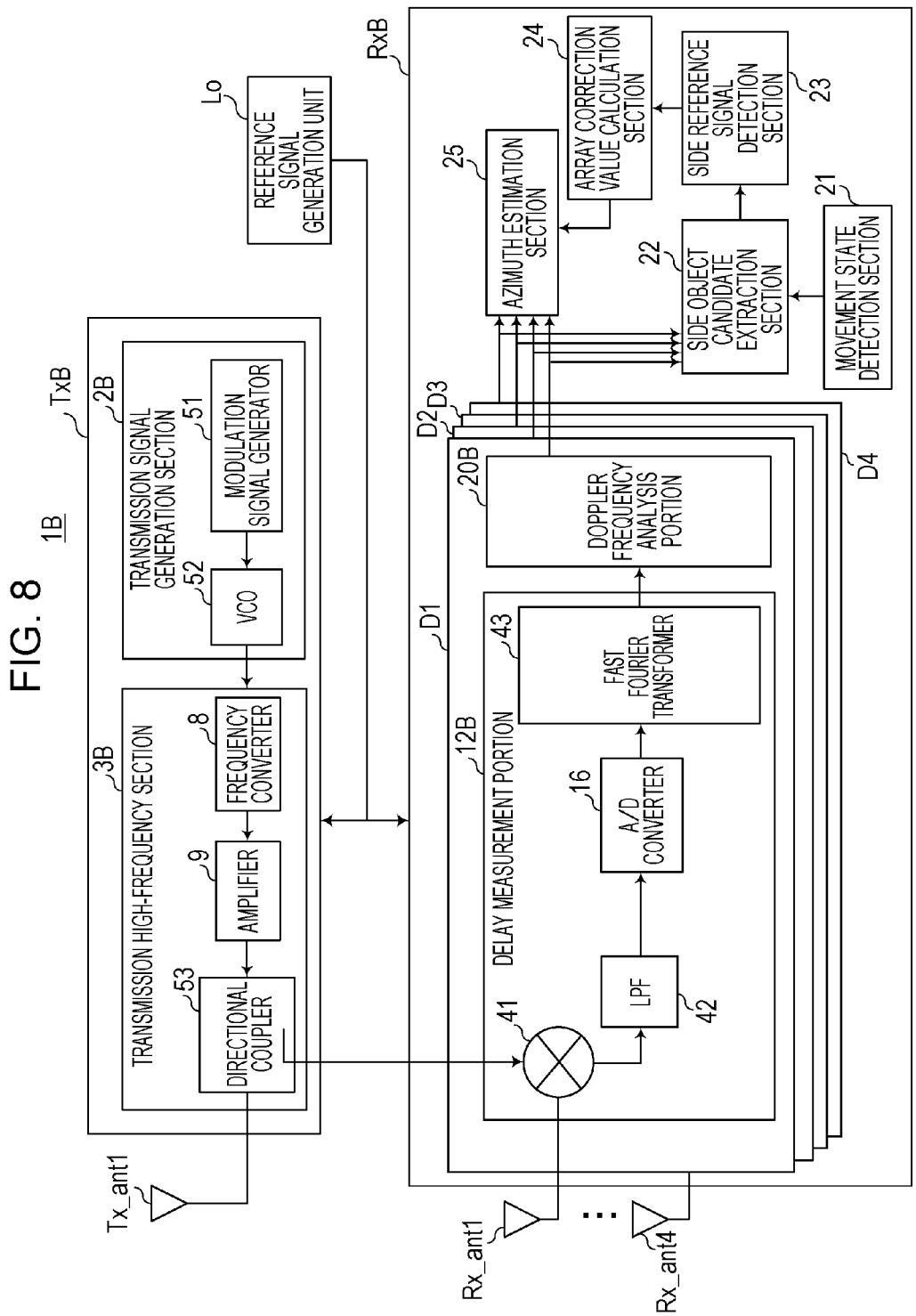

RADAR APPARATUS

BACKGROUND

1. Technical Field

The present disclosure relates to a radar apparatus mounted on a moving body such as a vehicle.

2. Description of the Related Art

A radar apparatus that receives a reflection signal from a target (hereinafter also referred to as an object) using a plurality of reception antennas included in an array antenna and that estimates the direction of arrival of the reflection signal from the object within a wide-angle range on the basis of phase differences between the reception signal received by the reception antennas is known.

In order to estimate the direction of arrival of a reflection signal from an object using an array antenna, amplitude and phase deviations between reception antenna systems caused in antenna elements included in the reception antenna systems, radio frequency (RF) circuits that handle high-frequency signals, and analog baseband circuits that handle baseband signals need to be corrected (hereinafter referred to as reception array correction). A digital beamforming (DBF) radar apparatus disclosed in Japanese Unexamined Patent Application Publication No. 2001-166029 is an example of the related art for reception array correction.

The DBF radar apparatus disclosed in Japanese Unexamined Patent Application Publication No. 2001-166029 detects phase differences of a digital reception signal between a reference element antenna and other element antennas and estimates, on the basis of detected phase differences between the reference element antenna and other element antennas belonging to the same group as the reference element antenna, phase differences between the reference element antenna and element antennas belonging to other groups. The DBF radar apparatus compares the estimated phase difference and the detected phase difference for each element antenna belonging to another group to calculate a phase correction value, and corrects the phase of the digital reception signal using the phase correction value. As a result, the DBF radar apparatus can calculate, for each element antenna, a phase correction value for offsetting a phase lead or lag due to changes in the temperature of a low-noise amplifier or temporal changes. Accordingly, the DBF radar apparatus can suppress deterioration of the accuracy of estimating the direction of arrival of a reflection signal from an object and deterioration of target direction estimation performance.

SUMMARY

In the DBF radar apparatus disclosed in Japanese Unexamined Patent Application Publication No. 2001-166029, however, phase differences used as reference for calculating phase correction values are, among phase differences between a reference element antenna and other element antennas detected using reflection from an object whose direction of arrival is unknown, detected phase differences between the reference element antenna and other element antennas belonging to the same group as the reference element antenna. Here, because phase differences including deviations between the reception antennas are detected, it is difficult to accurately detect phase differences deriving from the direction of arrival of a reflection signal from the object, which is problematic.

Therefore, detection of phase deviations performed for reception array correction includes errors and, as a result, errors according to the errors in the detection affect estimation of the direction of arrival of a reflection signal from a target.

One non-limiting and exemplary embodiment provides a radar apparatus that detects a reflection signal from a static target located at a side of a moving body on the basis of deviations in Doppler frequency and that performs reception array correction on the basis of the direction of arrival of the reflection signals from the still target, in order to suppress deterioration of the accuracy of correcting amplitude and phase deviations between reception antennas included in an array antenna.

In one general aspect, the techniques disclosed here feature a radar apparatus mounted on a moving body. The radar apparatus includes a radar transmitter that transmits a high-frequency radar transmission signal from a transmission antenna, and a radar receiver that receives a reflection signal, which is the radar transmission signal reflected from a static target or a moving target, using a plurality of reception antennas. The radar receiver includes a plurality of antenna system processors that each generate, through correlation calculation of the reflection signal and the radar transmission signal, an array correlation signal for each delay in arrival of the reflection signal at each Doppler frequency, a static target candidate extractor that extracts a plurality of array correlation signals corresponding to a candidate for a static target located at a side of the moving body on the basis of outputs of the plurality of antenna system processors and a Doppler frequency of a reflection signal from the static target, a reference signal detector that outputs a reference signal indicating presence of the static target at the side of the moving body on the basis of a correlation between the plurality of array correlation signals corresponding to the candidate for the static target located at the side of the moving body, and a correction value calculator that calculates a correction value for correcting deviations between the plurality of reception antennas using the reference signal and information regarding a mounting angle of the radar apparatus mounted on the moving body.

According to the present disclosure, by detecting a reflection signal from a static target located at a side of a moving body on the basis of deviations in Doppler frequency and performing reception array correction on the basis of the direction of arrival of the reflection signal from the static target, the accuracy of estimating the direction of arrival of a reflection signal from an object can be suppressed and, accordingly, deterioration of target direction estimation performance can be suppressed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating the internal configuration of a radar apparatus according to a third embodiment in detail;

DETAILED DESCRIPTION

A radar apparatus according to each embodiment of the present disclosure will be described hereinafter with reference to the drawings. The radar apparatus according to each embodiment of the present disclosure is mounted on a moving body (for example, a vehicle CR, which is the case in the following description) that moves straight ahead in a traveling direction or that turns. The moving body on which the radar apparatus is mounted, however, is not limited to the vehicle CR, but may be, for example, a motorcycle or an autonomous robot.

First Embodiment

Figure 1:
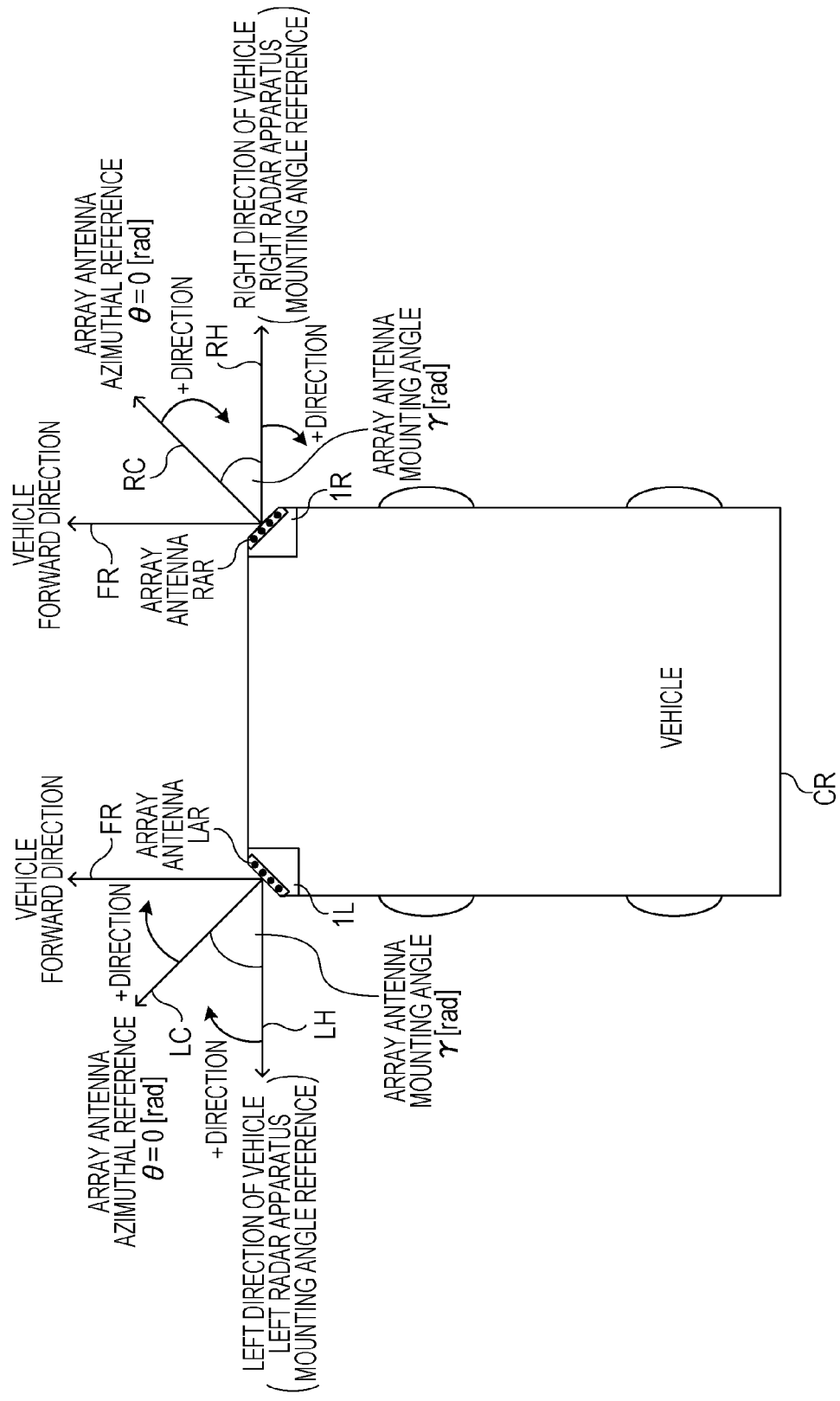
FIG. 1 is a diagram illustrating a relationship between a vehicle coordinate system and a radar coordinate system viewed from above.

FIG. 1 is a diagram illustrating a relationship between a vehicle coordinate system and a radar coordinate system viewed from above. In a first embodiment, for example, the vehicle CR includes two radar apparatuses 1L and 1R at front left and right corners thereof, respectively, relative to a forward direction FR, but the vehicle CR may include two radar apparatuses at rear left and right corners thereof.

In FIG. 1, a mounting angle γ of a plurality of reception antennas (hereinafter referred to as an "array antenna") of the radar apparatus 1L is the angle of a direction LC perpendicular to an opening of an array antenna LAR of the radar apparatus 1L relative to a left direction LH of the vehicle CR, which is a reference mounting angle of the left radar apparatus 1L. The mounting angle γ of the array antenna LAR of the radar apparatus 1L increases clockwise (γ>0) from the reference angle (0 [rad]), which is the left direction LH of the vehicle CR. The direction LC perpendicular to the opening of the array antenna LAR of the radar apparatus 1L serves as a reference direction (θ=0 [rad]) for the azimuthal angle of the radar apparatus 1L. The azimuthal angle increases clockwise.

The left direction LH of the vehicle CR is perpendicular to the traveling direction of the vehicle CR. The direction LC perpendicular to the opening of the array antenna LAR of the radar apparatus 1L is, for example, perpendicular to a board on which the array antenna LAR is arranged in two dimensions.

The mounting angle γ of an array antenna RAR of the radar apparatus 1R is the angle of a direction RC perpendicular to an opening of the array antenna RAR of the radar apparatus 1R relative to a right direction RH of the vehicle CR, which is a reference mounting angle of the right radar apparatus 1R. The mounting angle γ of the array antenna RAR of the radar apparatus 1R increases clockwise (γ>0) from the reference angle (0 [rad]), which is the right direction RH of the vehicle CR. The direction RC perpendicular to the opening of the array antenna RAR of the radar apparatus 1R serves as a reference direction (θ=0 [rad]) for the azimuthal angle of the radar apparatus 1R. The azimuthal angle increases clockwise.

The right direction RH of the vehicle CR is perpendicular to the traveling direction of the vehicle CR. The direction RC perpendicular to the opening of the array antenna RAR of the radar apparatus 1R is, for example, perpendicular to a board on which the array antenna RAR is arranged in two dimensions.

Because the internal configuration of the radar apparatuses 1L and 1R is the same, the radar apparatuses 1L and 1R will be collectively described as, for example, radar apparatuses 1 using the mounting angle γ and the azimuthal angle θ. The radar apparatuses 1L and 1R will also be described specifically as necessary.

In the following description, because detection ranges of the azimuthal angles of the radar apparatuses 1L and 1R (radar apparatuses 1) are $\theta_{min} \le \theta_u \le \theta_{max}$, the left direction RH and the right direction LH of the vehicle CR ($\theta_u = -\gamma$) are included in the detection ranges. That is, the detection range of the azimuthal angle of the radar apparatus 1L, which is mounted at the front left corner of the vehicle CR, includes the left direction H ($\theta_u = -\gamma$), and the detection range of the azimuthal angle of the radar apparatus 1R, which is mounted at the front right corner of the vehicle CR, includes the right direction RH ($\theta_u = -\gamma$). In other words, the detection ranges of the azimuthal angles of the radar apparatuses 1 include $\theta_{min} \le -\gamma \le \theta_{max}$. Since the mounting angle γ uses the right direction RH as reference, γ<0. Since the azimuthal angle θ uses the azimuthal angle of the right array antenna RAR as reference, -γ>0. Therefore, $\theta_u = -\gamma$ in the right direction RH.

Figure 2:
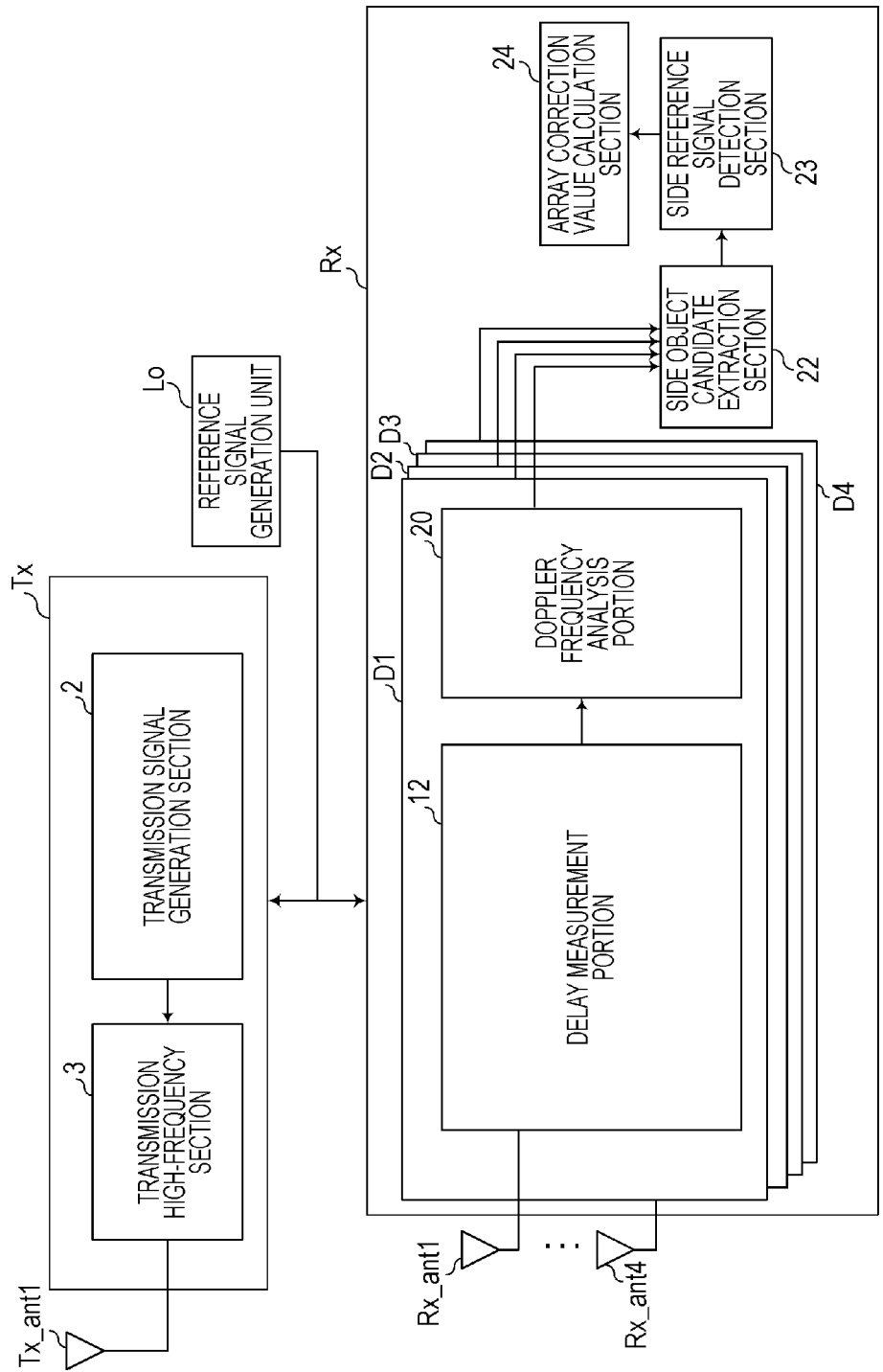
FIG. 2 is a diagram schematically illustrating the internal configuration of a radar apparatus according to a first embodiment.
Figure 3:
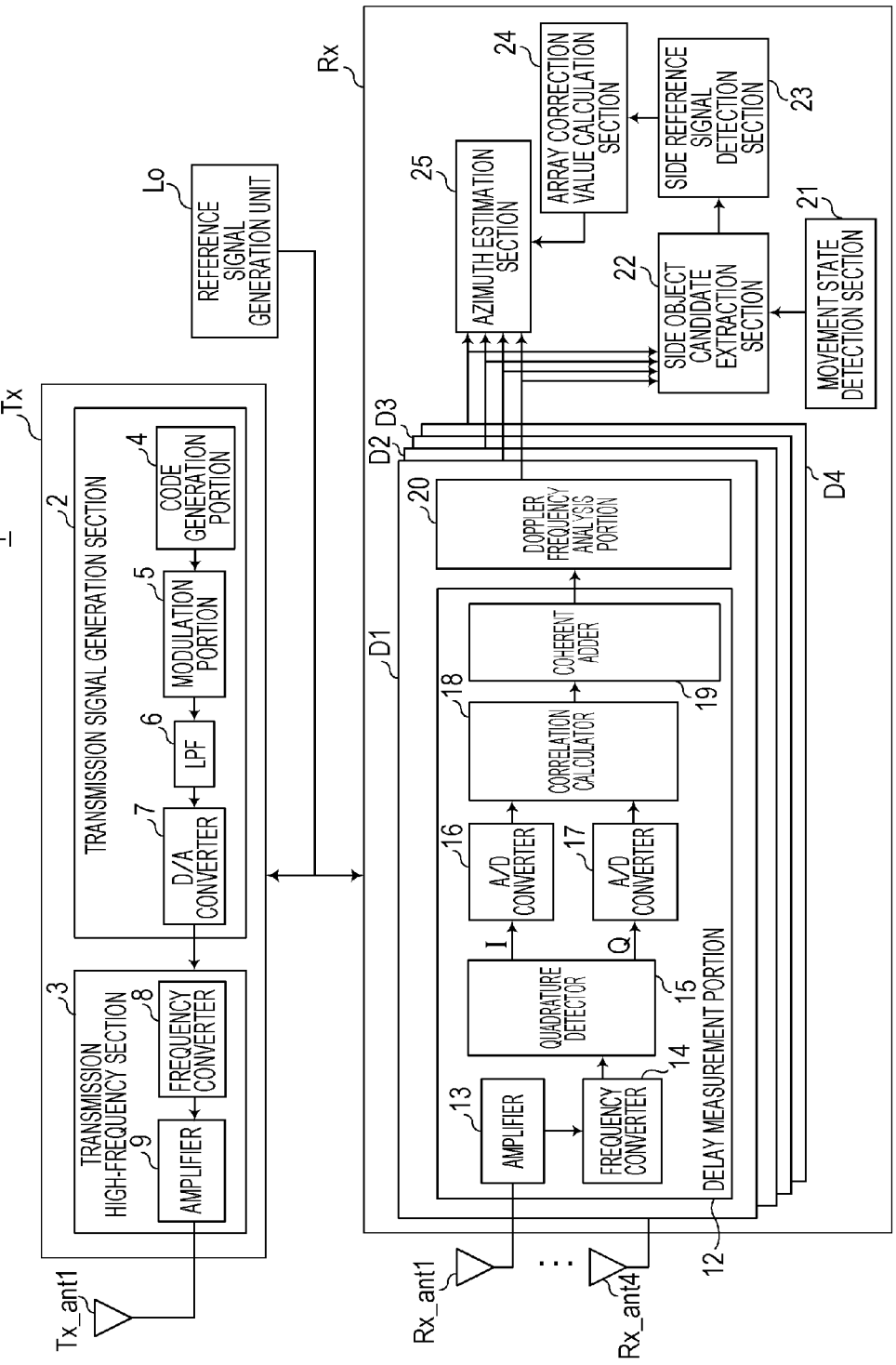
FIG. 3 is a diagram illustrating the internal configuration of the radar apparatus according to the first embodiment in detail.
Figure 4A:
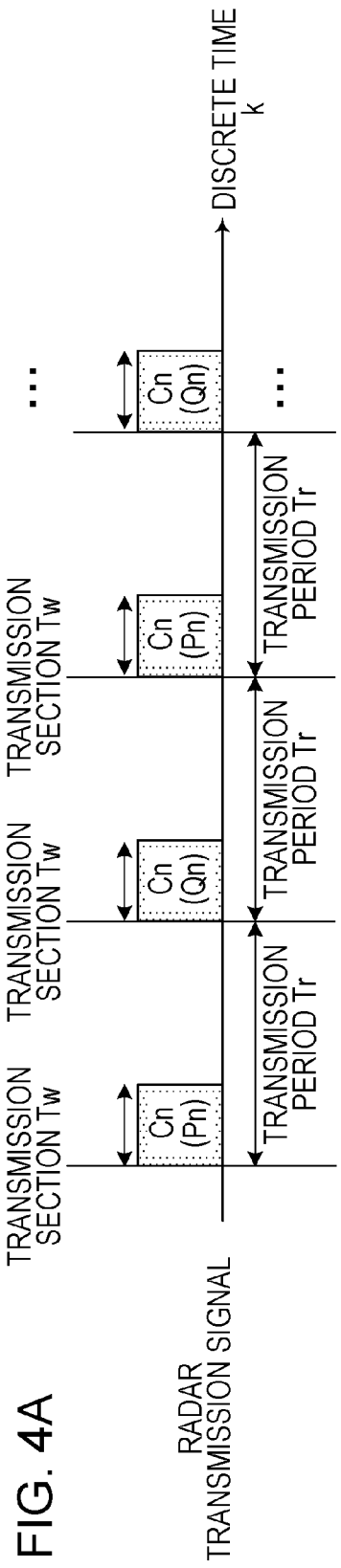
FIG. 4A is a diagram illustrating a relationship between transmission sections and transmission periods of radar transmission signals and FIG. 4B is a diagram illustrating the internal configuration of another transmission signal generation section.
Figure 4B:
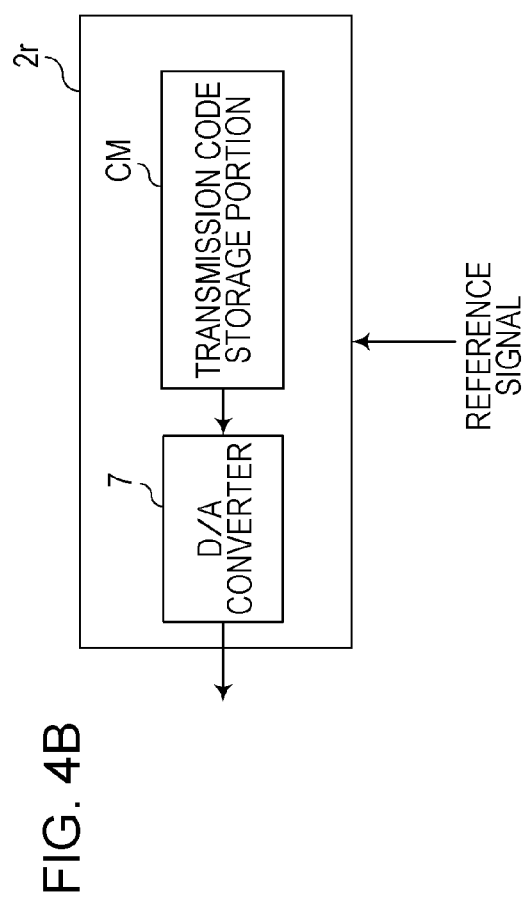

Next, the configuration and the operations of a radar apparatus 1 according to the first embodiment will be described with reference to FIGS. 2 to 6. FIG. 2 is a diagram schematically illustrating the internal configuration of the radar apparatus 1 according to the first embodiment. FIG. 3 is a diagram illustrating the internal configuration of the radar apparatus 1 according to the first embodiment in detail. FIG. 4A is a diagram illustrating a relationship between transmission sections and transmission periods of radar transmission signals. FIG. 4B is a diagram illustrating the internal configuration of another transmission signal generation section.

The radar apparatus 1 transmits, from a transmission antenna Tx_ant1, a high-frequency radar transmission signal generated by a radar transmission unit Tx. The radar apparatus 1 receives a reflection signal, which is a radar transmission signal reflected from an object (not illustrated), using an array antenna (for example, four reception antennas Rx_ant1 to Rx_ant4 illustrated in FIG. 2). The array antenna LAR (RAR) of the radar apparatus 1L (radar apparatus 1R)

includes the four reception antennas Rx_ant1 to Rx_ant4 of the radar apparatus 1 illustrated in FIG. 2. The transmission antenna Tx_ant1 may be arranged on the same board as the reception antennas Rx_ant1 to Rx_ant4, or may be arranged on a different board.

The radar apparatus 1 detects an object (hereinafter also referred to as a static target, a still target, a moving target, or a moving target) by processing a reflection signal received by the four reception antennas Rx_ant1 to Rx_ant4 and estimates a speed $v_d(f_s)$ of a moving target relative to the vehicle CR including the radar apparatuses 1 (the radar apparatuses 1L and 1R).

A static target and a moving target are objects to be detected by the radar apparatus 1 and include an automobile, a motorcycle, and a person, which holds in the following embodiments. The reception antennas Rx_ant1 to Rx_ant4 may be reception antenna elements, instead. The number of reception antennas included in the array antenna of the radar apparatus 1 is not limited to four.

First, the configuration of the components of the radar apparatus 1 will be briefly described.

The radar apparatus 1 illustrated in FIG. 2 includes a reference signal generation unit Lo, the radar transmission unit Tx, and a radar reception unit Rx. The radar transmission unit Tx includes a transmission signal generation section 2 and a transmission high-frequency section 3 connected to the transmission antenna Tx_ant1.

The reference signal generation unit Lo is connected to the radar transmission unit Tx and the radar reception unit Rx. The reference signal generation unit Lo supplies a reference signal to the radar transmission unit Tx and the radar reception unit Rx to synchronize processing performed by the radar transmission unit Tx and the radar reception unit Rx.

The radar reception unit Rx includes, for example, four antenna system processing sections D1, D2, D3, and D4, a side object candidate extraction section 22, a side reference signal detection section 23, and an array correction value calculation section 24. The radar reception unit Rx illustrated in FIG. 2 includes, for example, the four antenna system processing sections D1 to D4 in accordance with the number of reception antennas, but the number of antenna system processing sections is not limited to four. Two or more antenna system processing sections may be used by selecting a received reflection signal. Because the antenna system processing sections D1 to D4 have the same configuration, only the antenna system processing section D1 will be described in the following embodiments.

The antenna system processing section D1 includes a delay measurement portion 12 connected to the reception antenna Rx_ant1 and a Doppler frequency analysis portion 20.

Next, the operations of the components of the radar transmission unit Tx and the radar reception unit Rx illustrated in FIG. 2 will be described in detail.

The transmission signal generation section 2 generates a transmission reference clock signal, which is a signal obtained by multiplying the reference signal generated by the reference signal generation unit Lo by a certain value. The components of the transmission signal generation section 2 operate on the basis of the transmission reference clock signal.

Figure 9A:
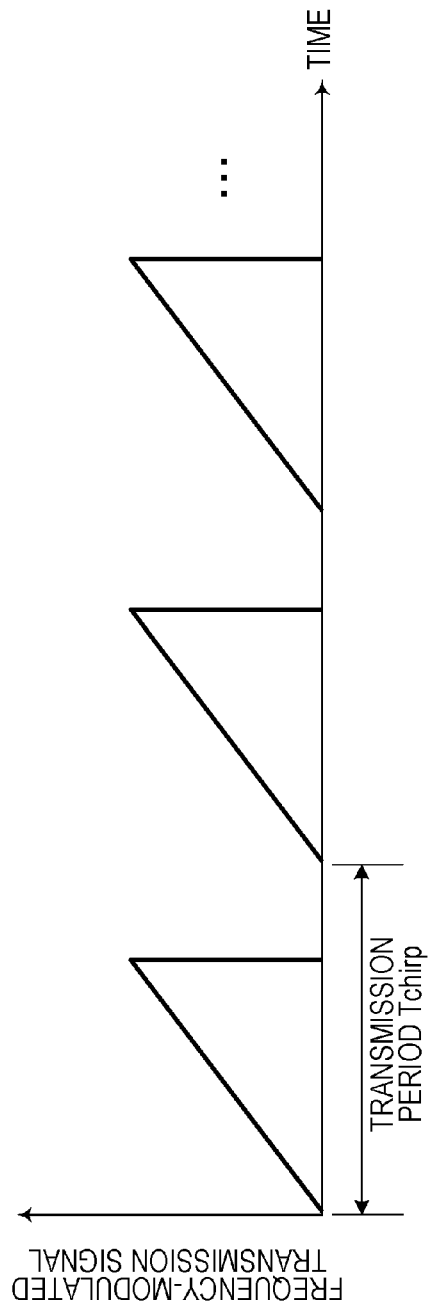
FIG. 9A is a diagram illustrating a relationship between a frequency-modulated transmission signal and transmission periods and FIG. 9B is a diagram illustrating a reflection reception signal, which is the frequency-modulated transmission signal illustrated in FIG. 9A reflected from a static target or a moving target.

The baseband transmission signal generated by the transmission signal generation section 2 may be, for example, coded pulses illustrated in FIG. 4A or may be chirped pulses, which are obtained as a result of frequency modulation, illustrated in FIG. 9A. The baseband transmission signal is repeatedly transmitted after a certain number of transmission periods.

The transmission high-frequency section 3 up-converts the transmission signal generated by the transmission signal generation section 2 to generate a radar transmission signal in a carrier frequency band (for example, a millimeter-wave band).

The transmission antenna Tx_ant1 radiates the radar transmission signal generated by the transmission high-frequency section 3 into the air.

The reception antenna Rx_ant1 receives a reflection signal, which is the radar transmission signal transmitted from the radar transmission unit Tx and reflected from a static target or a moving target. The high-frequency radar reception signal received by the reception antenna Rx_ant1 is input to the delay measurement portion 12.

The delay measurement portion 12 calculates a correlation between the reception signal received by the reception antenna Rx_ant1 and the transmission signal in each transmission period and measures a correlation calculation value (a value including a complex number) for each delay by varying a delay in the reception of the reflection signal from a static target or a moving target, that is, time elapsed since the radar transmission signal was transmitted.

The delay measurement portion 12 outputs the correlation calculation value for each delay in each transmission period or in each integral multiple of the transmission period.

The Doppler frequency analysis portion 20 multiplies the correlation calculation value for each delay output from the delay measurement portion 12 by correction coefficients $\epsilon(f_s)$ for phase variation according to a plurality of Doppler frequencies $f_s\Delta\theta$, performs a coherent addition process (an addition process including amplitude and phase components), and outputs results of the coherent addition process of a plurality of Doppler frequency components for each delay.

The number of Doppler frequencies $f_s\Delta\theta$ included in each correlation calculation value can be determined on the basis of the results of the coherent addition process performed on the Doppler frequency components. The correction coefficients $\epsilon(f_s)$ for phase variation according to the plurality of Doppler frequencies $f_s\Delta\theta$ are coefficients held in advance based on a highest possible Doppler frequency and desired Doppler frequency intervals.

Here, $f_s=-Nf+1, \ldots, 0, \ldots, Nf-1$. Nf is an integer equal to or larger than 2. $\Delta\theta$ is a parameter for adjusting the range of Doppler frequencies to be detected and a value predetermined in accordance with the range of Doppler frequency components of an assumed static target or moving target. $\Delta\theta$ serves as a phase shift unit (a certain value).

The side object candidate extraction section 22 determines, using vehicle speed vector detection values (Vs [m/s] and Vb [ms]) (described later) of the vehicle CR, whether the vehicle CR is moving straight ahead. If the vehicle CR is moving straight ahead, the side object candidate extraction section 22 extracts correlation vectors (hereinafter referred to as "reception array responses") h_static(k_static, 0, w) corresponding to a candidate for a static target located at a side of the vehicle CR from correlation vectors h(k, $f_s$, w) for each discrete delay k at each Doppler frequency $f_s\Delta\theta$, the correlation vectors being w-th outputs of the antenna system processing sections D1 to D4. k_static will be described later. Here, w is an integer equal to or larger than 1 and denotes the number of times that the transmission periods have been repeated or an integral multiple of the transmission periods has been repeated. k is an index indicating a discrete delay and an integer within a certain range.

The side reference signal detection section 23 detects, through a certain calculation process, which will be described later, consistency between the reception array responses corresponding to a candidate for a static target extracted by the side object candidate extraction section 22 at once or consistency between the reception array responses corresponding to a candidate for a static target extracted by the side object candidate extraction section 22 over a plurality of times. The side reference signal detection section 23 determines reception array responses whose consistency is high as reflection wave signals from a static target located at a side of the vehicle CR. The side reference signal detection section 23 then outputs the reflection wave signals to the array correction value calculation section 24 as vehicle side reference signals h_ref, that is, as signals indicating that a static target is located in the right direction RH or the left direction LH of the vehicle CR illustrated in FIG. 1 and that the reception array responses can be used as reception array responses of the reflection wave that has arrived from the right direction RH or the left direction LH of the vehicle CR.

The array correction value calculation section 24 holds a direction vector a(θ), which will be described later, and calculates array correction values h_cal$_{[nn]}$, which are products of complex conjugates of elements h_ref$_{[nn]}$ of the vehicle side reference signals h_ref indicated by a column vector and elements a(−γ)$_{[nn]}$ of a direction vector a(−γ) at −γ [rad] detected at a side of the vehicle CR. Here, nn ranges from 1 to Na. Na is the number of antenna system processing sections included in the radar reception unit Rx.

Next, the configuration of the components of the radar transmission unit Tx will be described in detail with reference to FIG. 3. The radar transmission unit Tx illustrated in FIG. 3 includes the transmission signal generation section 2 and the transmission high-frequency section 3 connected to the transmission antenna Tx_ant1.

The transmission signal generation section 2 includes a code generation portion 4, a modulation portion 5, a low-pass filter (LPF) 6, and a digital-to-analog (D/A) converter 7. In FIG. 3, an output of the LPF 6 is input to the D/A converter 7. The LPF 6 may be provided outside the transmission signal generation section 2, instead. For example, in FIG. 3, the LPF 6 may be provided between the transmission signal generation section 2 and the transmission high-frequency section 3. The transmission high-frequency section 3 includes a frequency converter 8 and an amplifier 9.

Here, a radar transmission signal, which is output from the transmission signal generation section 2, that uses coded pulses will be described.

In FIG. 4A, the transmission signal generation section 2 outputs coded pulses as a radar transmission signal. In a transmission section Tw [s] included in each transmission period Tr, each code of a code sequence C$_n$ having a code length L is modulated using No samples of the transmission reference clock signal. Here, n ranges from 1 to L (>0). L (integer) denotes the code length of the code sequence C$_n$.

A sampling rate in the transmission signal generation section 2 is (No×L)/Tw, and the transmission signal generation section 2 generates a radar transmission signal. The radar transmission signal is modulated using Nr (=No×L) samples in the transmission section Tw [s] included in each transmission period Tr, and a remaining section (Tr−Tw) [s] includes a no-signal section. Nu samples are included in the no-signal section (Tr−Tw) [s] included in each transmission period Tr.

The transmission signal generation section 2 periodically generates a baseband radar transmission signal r(k, M) represented by Expression (1) by modulating the code sequence C$_n$ having the code length L. j is an imaginary number that satisfies j$^2$=−1. A time k is a discrete time relative to a beginning (k=0) of a transmission period Tr. k is a discrete value ranging from 0 to (Nr+Nu)−1 and indicates a timing (sampling timing) at which a transmission signal is generated.

M denotes an ordinal number of a transmission period Tr of a radar transmission signal. The transmission signal r(k, M) is a transmission signal at the discrete time k in an M-th transmission period Tr and represented by an in-phase signal component I(k, M) and a quadrature signal component Q(k, M) multiplied by the imaginary number j (refer to Expression (1)).

[Math. 1]

$$r(k,M)=I(k,M)+jQ(k,M) \tag{1}$$

The code generation portion 4 generates transmission codes of the code sequence C$_n$ having the code length L in each transmission section Tr. Each element of the code sequence C$_n$ is configured using, for example, two values of [−1, 1] or four values of [1, −1, j, −j]. In order for a reflection signal received by the radar reception unit Rx to achieve low sidelobe performance, for example, the code sequence C$_n$ preferably includes at least one of the following code sequences: a code sequence configuring a pair of complementary codes, a Barker code sequence, a pseudorandom noise (PN) code sequence, a Golay code sequence, an M-sequence code, and a code sequence configuring Spano codes. The code generation portion 4 outputs the generated transmission codes of the code sequence C$_n$ to the modulation portion 5. In the following description, the transmission codes of the code sequence C$_n$ will be referred to as "transmission codes C$_n$" for convenience of description.

In order to generate pairs of complementary codes (for example, a Golay code sequence or a Spano code sequence) as the transmission codes C$_n$, the code generation portion 4 alternately generates transmission codes P$_n$ and Q$_n$ in two periods (2Tr). That is, the code generation portion 4 generates the transmission codes P$_n$, which are one of the pairs of complementary codes, in the M-th transmission period Tr and outputs the transmission codes P$_n$ to the modulation portion 5. The code generation portion 4 then generates the transmission codes Q$_n$, which are the other of the pairs of complementary codes, in an (M+1)th transmission period Tr and outputs the transmission codes Q$_n$ to the modulation portion 5. Similarly, in an (M+2)th transmission period Tr and later, the code generation portion 4 generates the transmission codes P$_n$ and Q$_n$ in two periods and outputs the generated transmission codes P$_n$ and Q$_n$ to the modulation portion 5.

The modulation portion 5 performs pulse modulation on the transmission codes C$_n$ generated by the code generation portion 4 to generate the baseband transmission signal r(k, M) represented by Expression (1). The pulse modulation may be amplitude modulation, amplitude-shift keying (ASK), or phase-shift keying (PSK), which holds in the following embodiments.

For example, the PSK becomes binary phase-shift keying (BPSK) when, for example, phase modulation is performed on a transmission code C$_n$ configured using the two values of [−1, 1]. The PSK becomes quadrature phase-shift keying (QPSK) or quaternary PSK when, for example, phase modulation is performed on a transmission code $C_n$ configured using the four values of $[1, -1, j, -j]$.

The modulation portion 5 outputs, among transmission signals r(k, M), those whose frequencies are lower than or equal to a certain limiting band to the D/A converter 7 through the LPF 6. The LPF 6 may be omitted in the transmission signal generation section 2 and provided in a subsequent stage of the D/A converter 7, which also holds in the following embodiments.

The D/A converter 7 converts the digital transmission signal r(k, M) generated by the modulation portion 5 into an analog transmission signal. The D/A converter 7 outputs the analog transmission signal to the transmission high-frequency section 3.

The transmission high-frequency section 3 generates a transmission reference signal, which is obtained by multiplying the reference signal generated by the reference signal generation unit Lo by a certain value, in the carrier frequency band. The transmission reference clock signal and the transmission reference signal generated by the transmission signal generation section 2 and the transmission high-frequency section 3, respectively, may be obtained by multiplying the reference signal by different values, or may be obtained by multiplying the reference signal by the same value. The components of the transmission high-frequency section 3 operate on the basis of the transmission reference signal.

The frequency converter 8 up-converts the transmission signal r(k, M) generated by the transmission signal generation section 2 to generate a radar transmission signal in the carrier frequency band (for example, a millimeter wave band). The frequency converter 8 outputs the radar transmission signal to the amplifier 9.

The amplifier 9 amplifies the signal level of the radar transmission signal generated by the frequency converter 8 to a certain signal level and outputs the radar transmission signal to the transmission antenna Tx_ant1. The radar transmission signal amplified by the amplifier 9 is radiated into the air through the transmission antenna Tx_ant1.

The transmission antenna Tx_ant1 radiates the radar transmission signal generated by the transmission high-frequency section 3 into the air.

Both the transmission high-frequency section 3 and the delay measurement portion 12 included in each of the antenna system processing sections D1 to D4 receive the reference signal generated by the reference signal generation unit Lo. The transmission high-frequency section 3 operates on the basis of the transmission reference signal obtained by multiplying the reference signal by the certain value, and the delay measurement portion 12 included in each of the antenna system processing sections D1 to D4 operates on the basis of a reception reference signal obtained by multiplying the reference signal by the same value as that used by the transmission high-frequency section 3. Therefore, the processing of the transmission high-frequency section 3 and the delay measurement portion 12 included in each of the antenna system processing sections D1 to D4 synchronize.

The transmission signal generation section 2 need not include the code generation portion 4, the modulation portion 5, and the LPF 6 and may include a transmission code storage portion CM that stores in advance the transmission codes $C_n$ generated by the transmission signal generation section 2, instead (refer to FIG. 4B)

In order for the transmission signal generation section 2 to generate transmission codes that serve as a pair of complementary codes, the transmission code storage portion CM may store a pair of complementary codes, that is, for example, the transmission codes $P_n$ and $Q_n$. The configuration of a transmission signal generation section 2r illustrated in FIG. 4B can be applied not only to this embodiment but also to the following embodiments. The transmission signal generation section 2r includes the transmission code storage portion CM and the D/A converter 7.

The transmission code storage portion CM cyclically reads, therefrom, the transmission codes $C_n$ or the transmission codes $P_n$ or $Q_n$, which serve as the pair of complementary codes, in each transmission period Tr on the basis of the transmission reference clock signal obtained by multiplying the reference signal generated by the reference signal generation unit Lo by a certain value and outputs the transmission codes $C_n$ or the transmission codes $P_n$ or $Q_n$ to the D/A converter 7. A subsequent operation is the same as that of the D/A converter 7 described above, and accordingly description thereof is omitted.

Next, the configuration of the components of the radar reception unit Rx will be described with reference to FIG. 3.

The radar reception unit Rx illustrated in FIG. 3 includes the antenna system processing sections D1 to D4 (although the antenna system processing sections D1 to D4 will be described hereinafter since four antenna system processing sections are illustrated in FIG. 3, the number of antenna system processing sections is not limited to four) provided in accordance with the number (for example, four in FIG. 3) of reception antennas included in the array antenna, a movement state detection section 21, the side object candidate extraction section 22, the side reference signal detection section 23, the array correction value calculation section 24, and an azimuth estimation section 25.

The antenna system processing section D1 includes the delay measurement portion 12 connected to the reception antenna Rx_ant1 and the Doppler frequency analysis portion 20. The delay measurement portion 12 includes an amplifier 13, a frequency converter 14, a quadrature detector 15, two analog-to-digital (A/D) converters 16 and 17, a correlation calculator 18 and a coherent adder 19. The radar reception unit Rx periodically performs calculation using each transmission period Tr of radar transmission signals as a signal processing period of the delay measurement portion 12 included in each of the antenna system processing sections D1 to D4.

Figure 5:
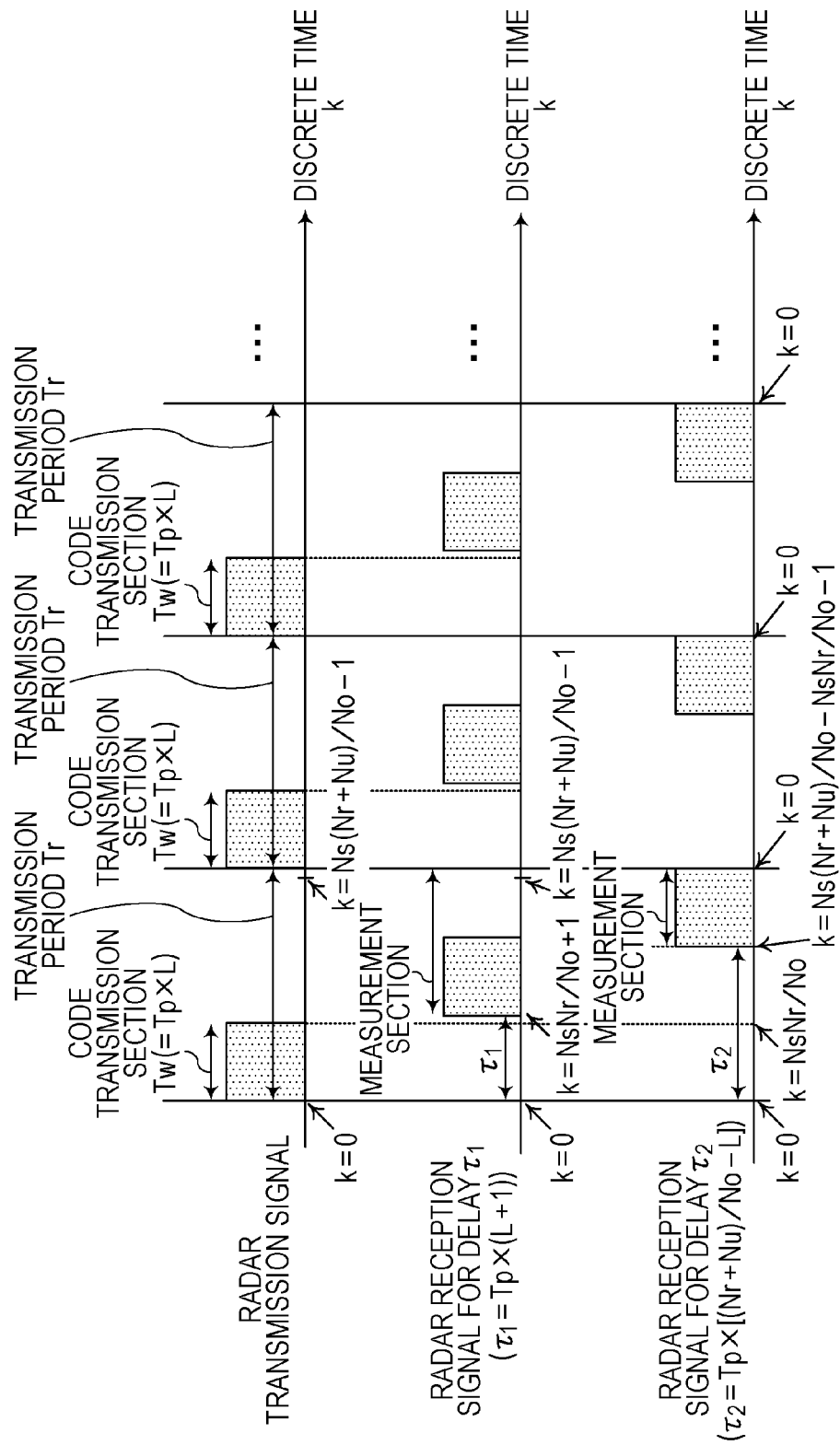
FIG. 5 is a diagram illustrating a relationship between the radar transmission signals, radar reception signals for a delay τ1, and radar reception signals for a delay τ2.
Figure 6:
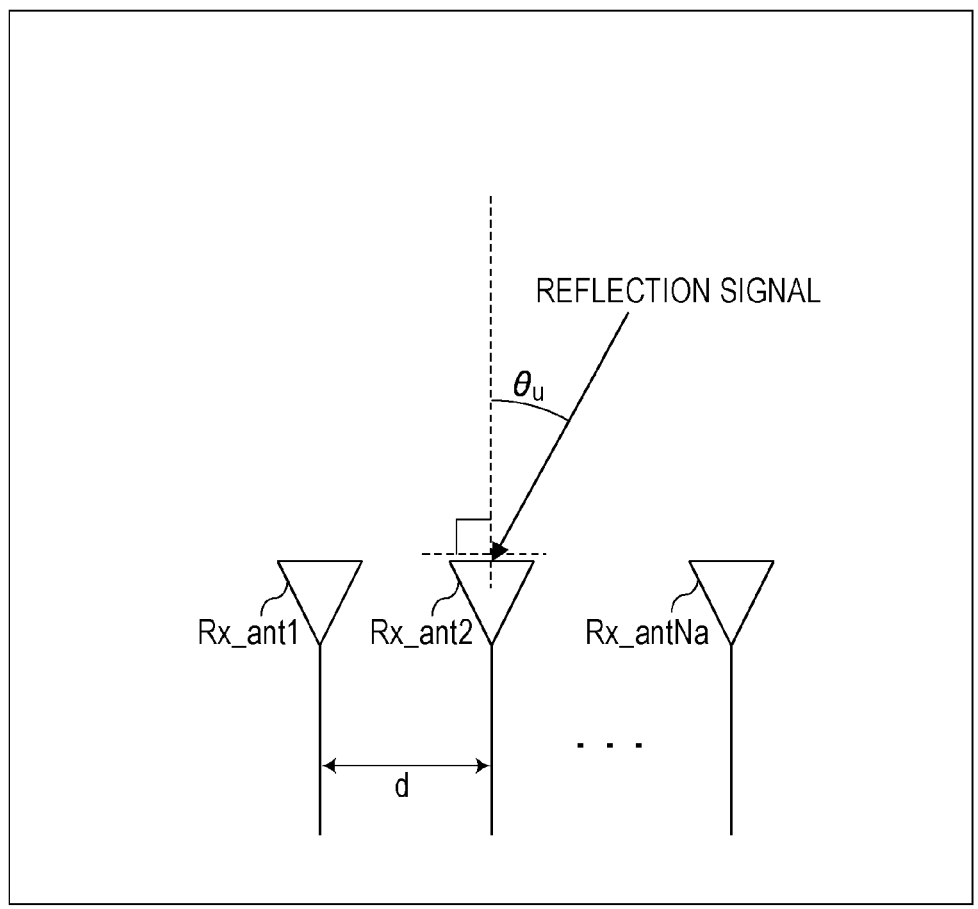
FIG. 6 is a diagram illustrating a relationship between arrangement of reception antenna elements included in an array antenna and an azimuthal angle $\theta_u$.

Next, the operations of the components of the radar reception unit Rx will be described in detail with reference to FIGS. 3, 5, and 6. FIG. 5 is a diagram illustrating a relationship between the radar transmission signals, radar reception signals for a delay $\tau_1$, and radar reception signals for a delay $\tau_2$. FIG. 6 is a diagram illustrating a relationship between the arrangement of the reception antennas Rx_ant1 to Rx_ant4 included in the array antenna and the azimuthal angle $\theta_u$.

The reception antenna Rx_ant1 receives a reflection signal, which is the radar transmission signal transmitted from the radar transmission unit Tx and reflected from an object. The high-frequency radar reception signal received by the reception antenna Rx_ant1 is input to the delay measurement portion 12.

As with the transmission high-frequency section 3, the delay measurement portion 12 generates the reception reference signal, which is obtained by multiplying the reference signal generated by the reference signal generation unit Lo by the certain value, in the carrier frequency band. The components of the delay measurement portion 12 operate on the basis of the reception reference signal.

The amplifier 13 amplifies the signal level of the radar reception signal received by the reception antenna Rx_ant1 to a certain signal level and outputs the radar reception signal to the frequency converter 14.

The frequency converter 14 down-converts the high-frequency radar reception signal using the radar reception signal amplified by the amplifier 13 and the reception reference signal to generate a baseband reception signal. The frequency converter 14 outputs the baseband reception signal to the quadrature detector 15.

The quadrature detector 15 performs quadrature detection on the baseband reception signal generated by the frequency converter 14 to generate reception signals including an in-phase signal and a quadrature signal. The quadrature detector 15 outputs, among the baseband reception signals, the in-phase signal to the A/D converter 16 and the quadrature signal to the A/D converter 17.

The A/D converter 16 samples the baseband in-phase signal generated by the quadrature detector 15 at each discrete time k and converts the in-phase signal, which is analog data, into digital data. The A/D converter 16 outputs the digital in-phase signal to the correlation calculator 18.

The A/D converter 16 performs the sampling Ns times for each pulse width (pulse period) Tp (=Tw/L) of the transmission signal r(k, M) generated by the radar transmission unit Tx. That is, the sampling rate of the A/D converter 16 is (Ns×L)/Tw=Ns/Tp, and the number of samples obtained for each pulse is Ns.

The A/D converter 17 operates for the baseband quadrature signal generated by the quadrature detector 15 in the same manner as the A/D converter 16 and outputs a digital quadrature signal to the correlation calculator 18. The sampling rate of the A/D converter 17 is Ns/Tp, and the number of samples obtained for each pulse is Ns.

The baseband reception signal, which is the output of each of the A/D converters 16 and 17, at the discrete time k in the M-th transmission period Tr is represented as a complex signal x(k, M) in Expression (2) using an in-phase signal component Ir(k, M) and a quadrature signal component Qr(k, M).

[Math. 2]

$$x(k,M)=Ir(k,M)+jQr(k,M) \quad (2)$$

A first row of FIG. 5 indicates timings at which the radar transmission signals are transmitted. The delay measurement portion 12 periodically operates while determining a section from the discrete time k=0 indicated in the first row of FIG. 5, that is, the beginning of each transmission period Tr, to k=Ns(Nr+Nu)/No−1, which is a sampling timing immediately before an end of each transmission period Tr as a signal processing section. That is, the delay measurement portion 12 periodically operates from the discrete time k=0 to the discrete time k=Ns(Nr+Nu)/No−1.

A second row of FIG. 5 is a diagram illustrating timings at which the radar reception signals for the delay $\tau_1$ are received. A third row of FIG. 5 is a diagram illustrating timings at which the radar reception signal for the delay $\tau_2$ is received. A discrete time k=Nr×(Ns/No)−1 indicates a time immediately before the transmission section Tw ends in each transmission period Tr. The digital reception signals x(k, M), which are the outputs of the A/D converters 16 and 17, will be referred to as discrete sample values x(k, M).

The correlation calculator 18 periodically generates the transmission codes $C_n$ having the code length L at each discrete time k on the basis of the reception reference clock signal, which is obtained by multiplying the reference signal generated by the reference signal generation unit Lo by the certain value. n is an integer ranging from 1 to L, and L denotes the code length of the code sequence $C_n$.

The correlation calculator 18 calculates a sliding correlation value AC(k, M) between discrete sample values Ir(k, M) and Qr(k, M) as the outputs of the A/D converters 16 and 17, that is, the discrete sample values x(k, M) as reception signals, and the transmission codes $C_n$ to measure a delay t from the beginning of the transmission of the radar transmission signal. AC(k, M) denotes a sliding correlation value at the discrete time k in the M-th transmission period Tr.

More specifically, the correlation calculator 18 calculates, using Expression (3), the sliding correlation value AC(k, M) in each transmission period Tr indicated in the second row of FIG. 5, that is, at each of the discrete times k=0 to Ns(Nr+Nu)/No−1. The correlation calculator 18 outputs the sliding correlation value AC(k, M) at each discrete time k calculated using Expression (3) to the coherent adder 19. An asterisk in Expression (3) denotes a complex conjugate operator.

[Math. 3]

$$AC(k, M) = \sum_{n=1}^{L} x(k + Ns(n-1), M)C_n^* \quad (3)$$

The second row of FIG. 5 illustrates an example in which the radar reception signals are received the delay $\tau_1$ after the beginnings of transmission of the radar transmission signals. The third row of FIG. 5 illustrates an example in which the radar reception signals are received the delay $\tau_2$ after the beginnings of transmission of the radar transmission signals. The delays $\tau_1$ and $\tau_2$ are discrete times represented by Expressions (4) and (5), respectively.

[Math. 4]

$$\tau_1 = Tp \times (L+1) \quad (4)$$

[Math. 5]

$$\tau_2 = Tp \times \left\{ \frac{(Nr + Nu)}{No} - L \right\} \quad (5)$$

The correlation calculator 18 may limit a measurement range, that is, the range of the discrete time k indicating a range within which the sliding correlation values AC(k, m) are calculated, in accordance with a range within which an object to be measured by the radar apparatus 1 is located. As a result, the radar apparatus 1 can reduce the amount of calculation performed by the correlation calculator 18 and the amount of data stored in a buffer that temporarily stores results of the calculation. Therefore, the correlation calculator 18 can also reduce the amount of calculation performed by the delay measurement portion 12 and the amount of data stored in the buffer, thereby reducing the power consumption and the size of circuitry of the radar reception unit Rx.

The correlation calculator 18 in the radar apparatus 1 may calculate the sliding correlation values AC(k, m) within a range of discrete times k=Ns(L+1) to Ns(Nr+Nu)/No−NsL, instead. As a result, the amount of calculation performed by the correlation calculator 18 and the amount of data stored in the buffer that temporarily stores results of the calculation can be reduced. In addition, even if a radar transmission signal short-circuits to the radar reception unit Rx due to coupling of transmission and reception antennas or transmission and reception circuits, the radar apparatus 1 can perform measurement without the effect of a short circuit since the range of the discrete time k is limited to k=Ns(L+1) to Ns(Nr+Nu)/No−NsL as described above.

If the measurement range (the range of the discrete time k) is limited as described above, the coherent adder 19, the Doppler frequency analysis portion 20, the side object candidate extraction section 22, the side reference signal detection section 23, the array correction value calculation section 24, and the azimuth estimation section 25 operate within the same limited measurement range. Therefore, the amount of processing performed by these components and the amount of data stored in their respective buffers that temporary store results of the calculation can be reduced, thereby further reducing the power consumption and the size of the circuitry of the radar reception unit Rx.

The coherent adder 19, which is an example of a first coherent adder, performs coherent additions (additions including the amplitude and phase components) on the sliding correlation values AC(k, M) over a period (Np×Tr) including a certain number (Np) of transmission periods Tr using the sliding correlation value AC(k, M) calculated by the correlation calculator 18 at each discrete time k in the M-th transmission period Tr.

More specifically, the coherent adder 19 adds the sliding correlation value AC(k, M) at each discrete time k over the period (Np×Tr) including the certain number (Np) of transmission periods Tr and calculates, using Expression (6), a coherent addition value Cl(k, m) at each discrete time k in an m-th one of the Np transmission periods Tr. Np denotes a certain value indicating the number of additions performed by the coherent adder 19. m denotes an ordinal number of a coherent addition output for each of the number of coherent additions Np performed by the coherent adder 19 included in each of the antenna system processing sections D1 to D4.

For example, m=1 indicates a first coherent addition output of the coherent adder 19. The coherent adder 19 outputs the coherent addition value Cl(k, m) to the Doppler frequency analysis portion 20. In Expression (6), the discrete time k may be replaced by the delay τ.

[Math. 6]

$$Cl(k, m) = \sum_{g=1}^{Np} AC(k, Np(m-1) + g) \quad (6)$$

The coherent adder 19 can suppress noise components included in reflection signals through the addition process including phases in a period in which reflection signals from an object are highly correlated by performing the Np additions of the sliding correlation values AC(k, M). Accordingly, the coherent adder 19 can improve the reception quality (signal-to-noise ratio (SNR)) of the reflection signals. Furthermore, since the coherent adder 19 can improve the reception quality of the reflection signals, the accuracy of estimating the direction of arrival of the reflection signals from an object.

In order to obtain ideal addition gain, the phase components of the sliding correlation values AC(k, M) need to fall within a certain range in the period in which the sliding correlation values AC(k, M) are added Np times. That is, since a static target or a moving target is moving relative to the vehicle CR, the movement causes phase variation. Therefore, the number of additions Np is preferably set on the basis of the highest possible traveling speed of the object and the highest possible traveling speed of the vehicle CR during detection of the object.

As the highest possible traveling speed of the object relative to the vehicle CR increases, the amount of variation in Doppler frequency included in reflection signals from the object increases, and the length of discrete time in which highly correlated reflection signals are obtained becomes shorter. Therefore, the number of additions Np decreases, and the effect of improving coherent addition again produced by the coherent adder 19 becomes smaller.

Although the effect of reducing the number of additions performed by the Doppler frequency analysis portion 20 can be produced by providing the coherent adder 19 in a previous stage of the Doppler frequency analysis portion 20 in the first and other embodiments, the coherent adder 19 may be omitted, instead.

Although operations performed using a configuration including the coherent adder 19 will be described hereinafter in the first and other embodiments, the advantageous effects produced by the radar apparatus 1 according to this embodiment can be produced even using a configuration from which the coherent adder 19 is omitted.

In the case of the configuration from which the coherent adder 19 is omitted, the same advantageous effects can be produced by setting the number of coherent additions Np to 1. There are no other differences in the following description.

The Doppler frequency analysis portion 20, which is an example of a second coherent adder, uses phase variation according to 2Nf different Doppler frequencies $f_s\Delta\theta$ prepared in advance as the correction coefficients $\epsilon(f_s)$ (refer to Expression (7)) to perform coherent additions in units of coherent addition results Cl(k, Nc(w−1)+1) to Cl(k, Nc×w), which are Nc outputs of the coherent adder 19, obtained at each discrete time k (refer to Expression (8)). That is, by multiplying a reception signal whose Doppler frequency is unknown by the prepared correction coefficients $\epsilon(f_s)$, the Doppler frequency analysis portion 20 can detect the number of Doppler frequency components included in the reception signal on the basis of a correction coefficient with which a value obtained as a result of the multiplication is large.

The Doppler frequency analysis portion 20 outputs the coherent addition results of the number of coherent additions Nc obtained as a result of the calculation to the side object candidate extraction section 22 and the azimuth estimation section 25. Here, $\Delta\theta$ is a parameter for adjusting the range of Doppler frequencies to be detected and a value predetermined in accordance with the range of Doppler frequency components of an assumed static target or moving target. $\Delta\theta$ serves as a phase shift unit (a certain value).

[Math. 7]

$$\varepsilon(f_s) = 2\pi f_s(Tr \times Np)\Delta\theta \quad (7)$$

[Math. 8]

$$FT\_Cl^{Nant}(k, f_s, w) = \sum_{q=1}^{Nc} Cl^{Nant}(k, Nc(w-1) + q)\exp \quad (8)$$
$$[-jq\varepsilon(f_s)]$$
$$= \sum_{q=1}^{Nc} Cl^{Nant}(k, Nc(w-1) - q)\exp$$
$$[-jq2\pi f_s(Tr \times Np)]$$

The calculation in Expression (8) corresponds to a process for performing a discrete Fourier transform on the output of the coherent adder 19 with sampling intervals Tm=(Tr×Np) and a sampling frequency fm=1/Tm. w is an integer equal to or larger than 1 and denotes the number of times that (Np×Nc) transmission periods Tr are repeated. For example, if w=1, there are a total of (Np×Nc) transmission periods Tr, namely a first transmission period Tr to an (Np×Nc)th transmission period Tr. That is, each time (Np×Nc) transmission periods Tr have passed, the Doppler frequency analysis portion 20 outputs the coherent addition results represented by Expression (8) to the side object candidate extraction section 22 and the azimuth estimation section 25.

In Expression (8), Nant denotes the ordinal number (number) of the antenna system processing section ranging from 1 to Na (constant). For example, in the case of the radar reception unit Rx illustrated in FIG. 3, Na=4. Furthermore, in Expression (8), an exponential function component (exp component) denotes the amount of cancellation according to the 2Nf different Doppler frequencies $f_s\Delta\theta$ for canceling the phase variation $\epsilon(f_s)$ included in a reflection signal in accordance with the movement of an object. q denotes an integer ranging from 1 to Nc and denotes the range of the number of coherent additions performed by the Doppler frequency analysis portion 20.

FT_Cl$^{Nant}$(k, $f_s$, w) denotes a w-th output of the Doppler frequency analysis portion 20, which is a coherent addition result of the Nant-th antenna system processing section according to the Doppler frequency $f_s\Delta\theta$ at the discrete time. k ranges from 0 to ((Nr+Nu)×Ns/No)−1. $f_s$ is −Nf+1, ..., 0, ..., Nf. j is an imaginary number.

As a result of the calculation in Expression (8), the antenna system processing sections D1 to D4 output, in each period (Tr×Np×Nc) including (Np×Nc) transmission periods Tr, FT_Cl$^{Nant}$(k, −Nf+1, w) to FT_Cl$^{Nant}$(k, Nf, w), which are coherent addition results according to the 2Nf Doppler frequencies $f_s\Delta\theta$ at each discrete time k.

If Nf≥Nc, by setting Nf as a power of 2, a fast Fourier transform (FFT) can be applied to the calculation in Expression (8), thereby reducing the amount of calculation performed by the radar apparatus 1. In a region of qNc, a zero padding process by which Cl(k, Nc(w−1)+q)=0 is performed. If Nf<Nc, by setting Nc as a power of 2, an FFT can be applied to the calculation in Expression (8), thereby reducing the amount of calculation performed by the radar apparatus 1.

The Doppler frequency analysis portion 20 need not perform a fast Fourier transform, but may sequentially perform the calculation in Expression (8) (for example, Cl(k, Nc(w−1)+q), which are the Nc outputs of the coherent adder 19 obtained at each discrete time k) after generating coefficients exp[−jq2π$f_s$TrNp] corresponding to $f_s$=−Nf+1, ..., 0, ..., Nf. Here, q=1 to Nc.

FT_Cl$^1$(k, $f_s$, w) to FT_Cl$^{Na}$(k, $f_s$, w), which are outputs of the Doppler frequency analysis portion 20 included in each of the antenna system processing sections D1 to D4, are input to the side object candidate extraction section 22 and the azimuth estimation section 25 as the correlation vectors h(k, $f_s$, w) (refer to Expression (9)).

[Math. 9]

$$h(k, f_s, w) = \begin{bmatrix} FT\_Cl^1(k, f_s, w) \\ FT\_Cl^2(k, f_s, w) \\ \vdots \\ FT\_Cl^{Na}(k, f_s, w) \end{bmatrix} \quad (9)$$

Instead of the correlation vectors h(k, $f_s$, w) represented by Expression (9), correlation vectors h(k, $f_s$, w) that use one of the antenna system processing sections D1 to D4 as reference may be input to the side object candidate extraction section 22 and the azimuth estimation section 25 (refer to Expression (10)). In Expression (10), an asterisk denotes a complex conjugate operator. Although Expression (10) represents correlation vectors that use the antenna system processing section D1 as reference, the antenna system processing section used as reference is not limited to this.

[Math. 10]

$$h(k, f_s, w) = \begin{bmatrix} FT\_Cl^1(k, f_s, w) \\ FT\_Cl^2(k, f_s, w) \\ \vdots \\ FT\_Cl^{Na}(k, f_s, w) \end{bmatrix} \frac{FT\_Cl^1(k, f_s, w)^*}{|FT\_Cl^1(k, f_s, w)|} \quad (10)$$

The movement state detection section 21 calculates the vehicle speed vector detection values (Vs [m/s] and Vb [m/s]) using output values of vehicle sensors (for example, a vehicle speed sensor, a rudder angle sensor, and a yaw rate sensor), which are not illustrated, mounted on the vehicle CR and outputs the vehicle speed vector detection values to the side object candidate extraction section 22. Vs denotes a speed component of the vehicle CR in a forward direction, and Vb denotes a speed component of the vehicle CR in a lateral direction. A method for calculating the vehicle speed vector detection values (Vs and Vb) using the output values of the vehicle sensors mounted on the vehicle CR is disclosed, for example, in Japanese Unexamined Patent Application Publication No. 2004-177289.

The side object candidate extraction section 22, which is an example of a static target candidate extractor, determines whether the vehicle CR is moving straight ahead using the vehicle speed vector detection values (Vs [m/s] and Vb [m/s]) of the vehicle CR calculated by the movement state detection section 21. For example, if the speed component Vs of the vehicle CR in the forward direction is equal to or larger than a certain value and the speed component Vb of the vehicle CR in the lateral direction is zero or negligibly small, the side object candidate extraction section 22 determines that the vehicle CR is moving straight ahead.

Furthermore, if the vehicle CR is moving straight ahead, the side object candidate extraction section 22 extracts, from among the correlation vectors h(k, $f_s$, w) (refer to Expression (9) or (10)), which are the outputs of the antenna system processing sections D1 to D4, reception array responses h_static(k_static, 0, w) corresponding to a candidate for a static target (for example, a guardrail, a traffic sign, or a tree, which holds in the following description) located at a side of the vehicle CR. The side reference signal detection section 23 then outputs the extracted reception array responses h_static(k_static, 0, w) to the side reference signal detection section 23.

More specifically, since the Doppler frequency of a reflection signal from a static target located at a side of the vehicle CR is zero, the side object candidate extraction section 22 can extract, from among the outputs (correlation vectors h(k, $f_s$, w)) of the antenna system processing sections D1 to D4 in the w-th one of the (Np×Nc) transmission periods Tr, correlation vectors h(k, 0, w) whose indices ($f_s$) of the Doppler frequency $f_s\Delta\theta$ are zero and whose norms are larger than a certain value Lev_static as the reception array responses h_static(k_static, 0, w) corresponding to a candidate for a static target (refer to Expression (11)).

The side object candidate extraction section 22 may extract a candidate for a static target using a target located further than a certain distance, namely a plurality of traffic lanes, from the vehicle CR, instead. As a result, even if a movement component of a vehicle running in an adjacent traffic lane cancels a movement component of the vehicle CR on which the radar apparatus 1 is mounted, it is possible to avoid erroneous extraction of the vehicle running in the adjacent traffic lane as a candidate for a static target.

k_static denotes, among 0 to (Nr+Nu)Ns/No−1, discrete times that satisfy Expression (11). w is an integer equal to or larger than 1 and denotes the number of times that the (Np×Nc) transmission periods Tr have been repeated.

Instead of the norms of the correlation vectors indicated in Expression (11), squares of the norms of the correlation vectors, the amplitude of a certain component of the correlation vectors, or squares of the amplitude of the certain component of the correlation vectors may be used.

[Math. 11]

$$\|h(k\_static, 0, w)\| > Lev\_static \quad (11)$$

Here, if the vehicle CR is moving straight ahead, the Doppler frequency of a reflection signal from a static target located on side of the vehicle CR is zero, and an azimuthal angle detected by each of the reception antennas Rx_ant1 to Rx_ant4 is −γ [rad]. However, even if the vehicle CR is moving straight ahead, for example, a movement vector component of a moving target located in a direction other than a side of the vehicle CR (azimuthal angle −γ [rad]) might be canceling a movement component caused by the movement of the vehicle CR. Therefore, a reflection signal from a static target located at a side of the vehicle CR and a reflection signal from a moving target need to be distinguished.

Therefore, the side reference signal detection section 23, which is an example of a reference signal detector, detects, through a certain calculation process, consistency between reception array responses h_static(k_static, 0, w) corresponding to a candidate for a static target at a side of the vehicle CR extracted by the side object candidate extraction section 22 at once or consistency between reception array responses h_static(k_static, 0, w) corresponding to a candidate for a static target extracted by the side object candidate extraction section 22 over a plurality of times. The side reference signal detection section 23 determines reception array responses whose consistency is high as reflection wave signals from a static target located at a side of the vehicle CR. The side reference signal detection section 23 then outputs the reflection wave signals to the array correction value calculation section 24 as signals indicating that a static target is located at a side of the vehicle CR, that is, signals indicating that a static target is located in the right direction RH or the left direction LH of the vehicle CR illustrated in FIG. 1 and that the reception array responses can be used as reception array responses of the reflection wave signals that have arrived from the right direction RH or the left direction LH of the vehicle CR.

More specifically, the side reference signal detection section 23 detects, through calculation in Expression (12), consistency between the reception array responses h_static (k_static, 0, w) corresponding to a candidate for a static target extracted by the side object candidate extraction section 22 at once. In Expression (12), k_l and k_j denote different discrete times included in k_static. h_static(k_l, 0, w)$_{[1]}$ denotes a first element of h_static(k_l, 0, w) indicated by a column vector. h_static(k_j, 0, w)$_{[1]}$ denotes a first element of h_static(k_j, 0, w) indicated by a column vector. An H in superscript denotes a complex conjugate transpose operator.

In Expression (12), a certain value Lev_correlation is a real number equal to or larger than 0 but smaller than or equal to 1. If Lev_correlation is close to 1, reception array responses are not likely to be determined as vehicle side reference signals h_ref, but incorrect reflection signals are not likely to be used as vehicle side reference signals h_ref. This also holds in the following embodiments.

Although normalization is performed using the first element of h_static(k_j, 0, w) in Expression (12), another element of h_static(k_j, 0, w) may be used for the normalization. This holds in the following Expressions (13), (14), and (15).

[Math. 12]

$$\frac{h\_static(k\_l, 0, w)^H}{h\_static(k\_l, 0, w)_{[1]}} \frac{h\_static(k\_j, 0, w)}{h\_static(k\_j, 0, w)_{[1]}} > Lev\_correlation \quad (12)$$

If all of N_K different combinations of discrete times included in k_static as k_l and k_j satisfy Expression (12), the side reference signal detection section 23 determines reception array responses as reflection signals from a static target located at a side of the vehicle CR and outputs vehicle side reference signals h_ref represented by Expression (13) to the array correction value calculation section 24.

[Math. 13]

$$h\_ref = \frac{1}{N\_K} \sum_{k\_static} \frac{h\_static(k\_l, 0, w)}{h\_static(k\_l, 0, w)_{[1]}} \quad (13)$$

The side reference signal detection section 23 may fix k_l as a particular discrete time in addition to the N_K different combinations of discrete times included in k_static as k_l and k_j, instead. If combinations of k_l and different discrete times k_j satisfy Expression (12), the side reference signal detection section 23 may determine reception array responses as reflection signals from a static target located at a side of the vehicle CR and output the vehicle side reference signals h_ref represented by Expression (13) to the array correction value calculation section 24. As a result, the side reference signal detection section 23 can reduce the amount of calculation performed for the vehicle side reference signals h_ref, that is, the side reference signal detection section 23 can calculate the vehicle side reference signals h_ref more easily.

Alternatively, the side reference signal detection section 23 detects, through calculation in Expression (14), consistency between reception array responses h_static(k_j(w$_1$), 0, w$_1$) and h_static(k_j(w$_2$), 0, w$_2$) corresponding to a candidate for a static target extracted by the side object candidate extraction section 22 over a plurality of times. In Expression (14), k_l(w$_1$) and k_j(w$_2$) denote different discrete times included in k_static(w$_1$) and k_static(w$_2$), respectively.

w$_1$ and w$_2$ are different values denoting ordinal numbers of the number of times that reception array responses have been extracted by the side object candidate extraction section 22. h_static(k_l(w$_1$), 0, w)$_{[1]}$ denotes a first element of h_static(k_l($w_1$), 0, w) indicated by a column vector. h_static(k_j($w_2$), 0, w)$_{[1]}$ denotes a first element of h_static (k_j($w_2$), 0, w) indicated by a column vector. An H in superscript denotes a complex conjugate transpose operator.

[Math. 14]

$$\frac{h\_static(k\_l(w_1), 0, w_1)^H}{h\_static(k\_l(w_1), 0, w_1)_{[1]}} \frac{h\_static(k\_j(w_2), 0, w_2)}{h\_static(k\_j(w_2), 0, w_2)_{[1]}} > \text{Lev\_correlation} \quad (14)$$

If all of N_KJ different combinations of discrete times included in k_static as k_l($w_1$) and k_j($w_2$) satisfy Expression (14), the side reference signal detection section 23 determines reception array responses as reflection signals from a static target located at a side of the vehicle CR and outputs vehicle side reference signals h_ref represented by Expression (15) to the array correction value calculation section 24. By determining the consistency between the reception array responses h_static(k_j($w_1$), 0, $w_1$) and h_static(k_j($w_2$), 0, $w_2$) corresponding to a candidate for a static target extracted by the side object candidate extraction section 22 over a plurality of times, the side reference signal detection section 23 can generate the vehicle side reference signals h_ref in which errors in reflection signals from a static target located at a side of the vehicle CR are reduced.

[Math. 15]

$$h\_ref = \frac{1}{N\_KJ} \sum_n \sum_{k\_static(w_n)} \frac{h\_static(k\_l(w_n), 0, w_n)}{h\_static(k\_l(w_n), 0, w_n)_{[1]}} \quad (15)$$

The side reference signal detection section 23 may fix k_l($w_1$) as a particular discrete time in addition to the N_KJ different combinations of discrete times included in k_static ($w_1$) and k_static($w_2$) as k_l and k_j, instead. If combinations of k_l($w_1$) and different discrete times k_j($w_2$) satisfy Expression (14), the side reference signal detection section 23 may determine reception array responses as reflection signals from a static target located at a side of the vehicle CR and output the vehicle side reference signals h_ref represented by Expression (15) to the array correction value calculation section 24. As a result, the side reference signal detection section 23 can reduce the amount of calculation performed for the vehicle side reference signals h_ref, that is, the side reference signal detection section 23 can calculate the vehicle side reference signals h_ref more easily.

The array correction value calculation section 24, which is an example of a correction value calculator, can ignore deviations between reception arrays and holds in advance a direction vector a($\theta_u$), which is an Na-th column vector, including complex responses of the reception antennas as elements that are geometric-optically calculated if a reflection signal arrives from an azimuthal angle $\theta_u$.

The array correction value calculation section 24 calculates array correction values h_cal$_{[nn]}$ by multiplying complex conjugates of elements h_ref$_{[nn]}$ of the vehicle side reference signals h_ref, which are indicated by a column vector, by elements a(-γ) of a direction vector a(-γ) at -γ [rad] detected at a side of the vehicle CR and outputs the array correction values h_cal$_{[nn]}$ to the azimuth estimation section 25 (refer to Expression (17)). The array correction values h_cal$_{[nn]}$ are values for correcting the direction vector at a side of the vehicle CR using the vehicle side reference signals h_ref. nn ranges from 1 to Na.

Alternatively, for example, array correction values obtained, before shipment from a factory, in an anechoic chamber with a standard reflector set in a known direction may be stored in advance as initial values and, when power is supplied, correction may be performed using the initial array correction values. After the radar apparatus 1 is subjected to temporal changes, correction may be performed using this embodiment.

For example, if elements of the reception antennas of the array antenna are arranged in a line at equal intervals d (refer to FIG. 6), an ideal direction vector a($\theta_u$), which does not include phase or amplitude deviations between the reception antennas, is represented by Expression (16).

[Math. 16]

$$a(\theta_u) = \begin{bmatrix} 1 \\ \exp\{j2\pi d \sin\theta_u / \lambda\} \\ \vdots \\ \exp\{j2\pi(Na-1)d\sin\theta_u/\lambda\} \end{bmatrix} \quad (16)$$

[Math. 17]

$$h\_cal_{[nn]} = a(-\gamma)_{[nn]} / h\_ref_{[nn]} \quad (17)$$

The azimuthal angle $\theta_u$ is a variable that varies, using a variable u, within an estimated range [$\theta_{min}$, $\theta_{max}$] of directions of arrival of reflection signals to the radar apparatus 1 at certain intervals β and represented by, for example, Expression (18). u is an integer ranging from 0 to NU. NU is represented by Expression (19). In Expression (19), floor[y] is a function for outputting a largest integer smaller than or equal to a real number y.

[Math. 18]

$$\theta_u = \theta_{min} + u\beta \quad (18)$$

[Math. 19]

$$NU = \text{floor}[(\theta_{max} - \theta_{min})/\beta] + 1 \quad (19)$$

The azimuth estimation section 25 calculates, in accordance with Expression (20), correction correlation vectors h$_{after\_cal}$(k, $f_s$, w) for correcting amplitude and phase deviations between the correlation vectors h(k, $f_s$, w) using the correlation vectors h(k, $f_s$, w) (refer to Expression (9) or (10)), which are the outputs of the antenna system processing sections D1 to D4, and the array correction values h_cal$_{[nn]}$ calculated by the array correction value calculation section 24.

[Math. 20]

$$h_{after\_cal}(k, f_s, w) = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Na]} \end{bmatrix} h(k, f_s, w) \quad (20)$$

The azimuth estimation section 25 performs a process for estimating an azimuth based on phase differences, between the reception antennas Rx_ant1 to Rx_ant4, of reflection signals received by the reception antennas Rx_ant1 to Rx_ant4 using the correction correlation vectors $h\_{after\_cal}(k, f_s, w)$ represented by Expression (20).

More specifically, the azimuth estimation section 25 calculates azimuth estimation evaluation function values $P(\theta_u, k, f_s, w)$ represented by Expression (21) by varying the azimuthal angle $\theta_u$ for each discrete time k and Doppler frequency $f_s\Delta\theta$, or for each discrete time k and Doppler frequency $f_s\Delta\theta$ at which the norm or a square of the norm of each of the correction correlation vectors $h\_{after\_cal}(k, f_s, w)$ is equal to or larger than a certain value, using the correction correlation vectors $h\_{after\_cal}(k, f_s, w)$.

The azimuth estimation section 25 calculates, by varying the azimuthal angle $\theta_u$, an azimuthal angle indicating an azimuth at which a largest value or a relative maximum of the azimuth estimation evaluation function value $P(\theta_u, k, f_s, w)$ is obtained as a direction-of-arrival estimation value $DOA(k, f_s, w)$ (refer to Expression (22)). In Expression (22), u ranges from 1 to NU, and arg maxP(x) is an operator that outputs a domain value with which a function value P(x) becomes largest.

[Math. 21]

$$P(\theta_u, k, f_s, w) = a(\theta_u)^H H\_{after\_cal}(k, f_s, w) a(\theta_u) \quad (21)$$

[Math. 22]

$$DOA(k, f_s, w) = \underset{\theta_u}{\arg\max}\, P(\theta_u, k, f_s, w) \quad (22)$$

Various methods may be used for calculating the azimuth estimation evaluation function values $P(\theta_u, k, f_s, w)$ depending on a direction-of-arrival estimation algorithm. For example, an estimation method that uses an array antenna disclosed in "Direction-of-arrival estimation using signal subspace modeling", Cadzow, J. A.; Aerospace and Electronic Systems, IEEE Transactions on Volume: 28, Issue: 1, Publication Year: 1992, Pages: 64-79 may be used. Here, an H in superscript denotes a Hermitian transpose operator. Alternatively, for example, estimation methods such as Capon and MUSIC may be applied.

In Expression (21), $H\_{after\_cal}(k, f_s, w)$ denotes a correlation matrix, and any of Expressions (23) to (26) may be applied. In Expressions (24) to (26), DL denotes a certain integer.

By generating a correlation matrix while including discrete times adjacent to the discrete time k as in Expression (24), the azimuth estimation section 25 can suppress noise and improve the accuracy of estimating the azimuth.

By generating a correlation matrix while including Doppler frequencies adjacent to the Doppler frequency $f_s\Delta\theta$ as in Expression (25), the azimuth estimation section 25 can suppress noise and improve the accuracy of estimating the azimuth.

By generating a correlation matrix while including a w-th output and outputs before and after the w-th output as in Expression (26), the azimuth estimation section 25 can suppress noise and improve the accuracy of estimating the azimuth.

[Math. 23]

$$H\_{after\_cal}(k, f_s, w) = h\_{after\_cal}(k, f_s, w) h\_{after\_cal}(k, f_s, w)^H \quad (23)$$

[Math. 24]

$$H\_{after\_cal}(k, f_s, w) = \sum_{B=k-DL}^{k+DL} h\_{after\_cal}(B, f_s, w) h\_{after\_cal}(B, f_s, w)^H \quad (24)$$

[Math. 25]

$$H\_{after\_cal}(k, f_s, w) = \sum_{B=f_s-DL}^{f_s+DL} h\_{after\_cal}(k, B, w) h\_{after\_cal}(k, B, w)^H \quad (25)$$

[Math. 26]

$$H\_{after\_cal}(k, f_s, w) = \sum_{B=w-DL}^{w+DL} h\_{after\_cal}(k, f_s, B) h\_{after\_cal}(k, f_s, B)^H \quad (26)$$

The azimuth estimation section 25 outputs the discrete time k, the Doppler frequency $f_s\Delta\theta$, and the azimuthal angle $\theta_u$ as results of radar measurement of the position of a moving target on the basis of the direction-of-arrival estimation value $DOA(k, f_s, w)$ calculated by Expression (22). The azimuth estimation section 25 may calculate a distance $R(k)$ from the radar apparatus 1 using the discrete time k, instead (refer to Expression (27)). In Expression (27), Tw denotes the transmission section in each transmission period Tr. L denotes the code length, and $C_0$ denotes the speed of light.

[Math. 27]

$$R(k) = k\frac{Tw \times C_0}{2L} \quad (27)$$

Alternatively, the azimuth estimation section 25 may calculate, in accordance with Expression (28), the Doppler frequency $f_s\Delta\theta$ as the speed $v_d(f_s)$ of the moving target relative to the radar apparatus 1 and output the Doppler frequency $f_s\Delta\theta$. In Expression (28), $\lambda$ denotes the wavelength of a radar transmission signal transmitted from the transmission antenna Tx_ant1.

[Math. 28]

$$v_d(f_s) = \frac{\lambda}{2} f_s\Delta\theta \quad (28)$$

As a result, since the Doppler frequency of a reflection signal from a static target located at a side of the vehicle CR is zero and an azimuth detected by each of the reception antennas Rx_ant1 to Rx_ant4 is $-\gamma$, the radar apparatus 1 according to this embodiment can calculate, if the vehicle CR is moving straight ahead, the correction correlation vectors $h\_{after\_cal}(k, f_s, w)$ for correcting the amplitude and phase deviations between the outputs (correlation vectors) of the antenna system processing sections D1 to D4 using reflection signals received by the reception antennas Rx_ant1 to Rx_ant4.

The radar apparatus 1 estimates the direction of arrival of a reflection signal from a moving target using the correction correlation vectors $h\_{after\_cal}(k, f_s, w)$ and calculates the distance $R(k)$ between the radar apparatus 1 and the moving target and the relative speed $v_d(f_s)$ of the moving target.

Here, the properties of the reception antennas Rx_ant1 to Rx_ant4 and active circuits (for example, the amplifiers 13, which are low-noise amplifiers (LNAs)) change over time or over the years and accordingly amplitude and phase deviations between the outputs (correlation vectors) of the antenna system processing sections D1 to D4 change over time or over the years.

As a result of the above-described operations, the radar apparatus 1 according to this embodiment can perform accurate correction even if the amplitude and phase deviations between reflection signals received by the reception antennas Rx_ant1 to Rx_ant4 included in the array antenna change over time or over the years and suppress deterioration of the accuracy of estimating the azimuth of a static target or a moving target.

In addition, the radar apparatus 1 need not use additional hardware (for example, a dedicated calculation circuit) for calculating the correction correlation vectors $h\_{after\_cal}(k, f_s, w)$ for correcting the amplitude and phase deviations between the outputs (correlation vectors) of the antenna system processing sections D1 to D4. Furthermore, the radar apparatus 1 can calculate the correction correlation vectors $h\_{after\_cal}(k, f_s, w)$ using reflection signals from a static target located at a side of the vehicle CR without a prior adjustment that uses an object located in a known direction. Therefore, the accuracy of estimating the azimuth of a static target or a moving target.

Although an example in which the radar apparatus 1 calculates the correction correlation vectors $h\_{after\_cal}(k, f_s, w)$ when the vehicle CR on which the radar apparatus 1 is mounted is moving straight ahead has been described in this embodiment, the vehicle CR need not necessarily be moving straight ahead. For example, even if the radar apparatus 1 is mounted on a rear axle of the vehicle CR and the vehicle CR is turning, deviations in the Doppler frequency at a side of the vehicle CR are zero. Therefore, even if the vehicle CR is turning, the radar apparatus 1 can similarly calculate the correction correlation vectors $h\_{after\_cal}(k, f_s, w)$ for correcting the amplitude and phase deviations between the outputs (correlation vectors) of the antenna system processing sections D1 to D4. Accordingly, the accuracy of estimating the azimuth of a static target or a moving target can be improved.

Second Embodiment

In a second embodiment, a radar apparatus 1A including a radar transmission unit TxA that switches a main beam direction of a radar transmission signal instead of the radar transmission unit Tx of the radar apparatus 1 according to the first embodiment will be described with reference to FIG. 7. The radar apparatus 1A according to the second embodiment may be applied to a radar apparatus C according to a fourth embodiment, which will be described later (refer to a radar apparatus 1D illustrated in FIG. 11).

Figure 7:
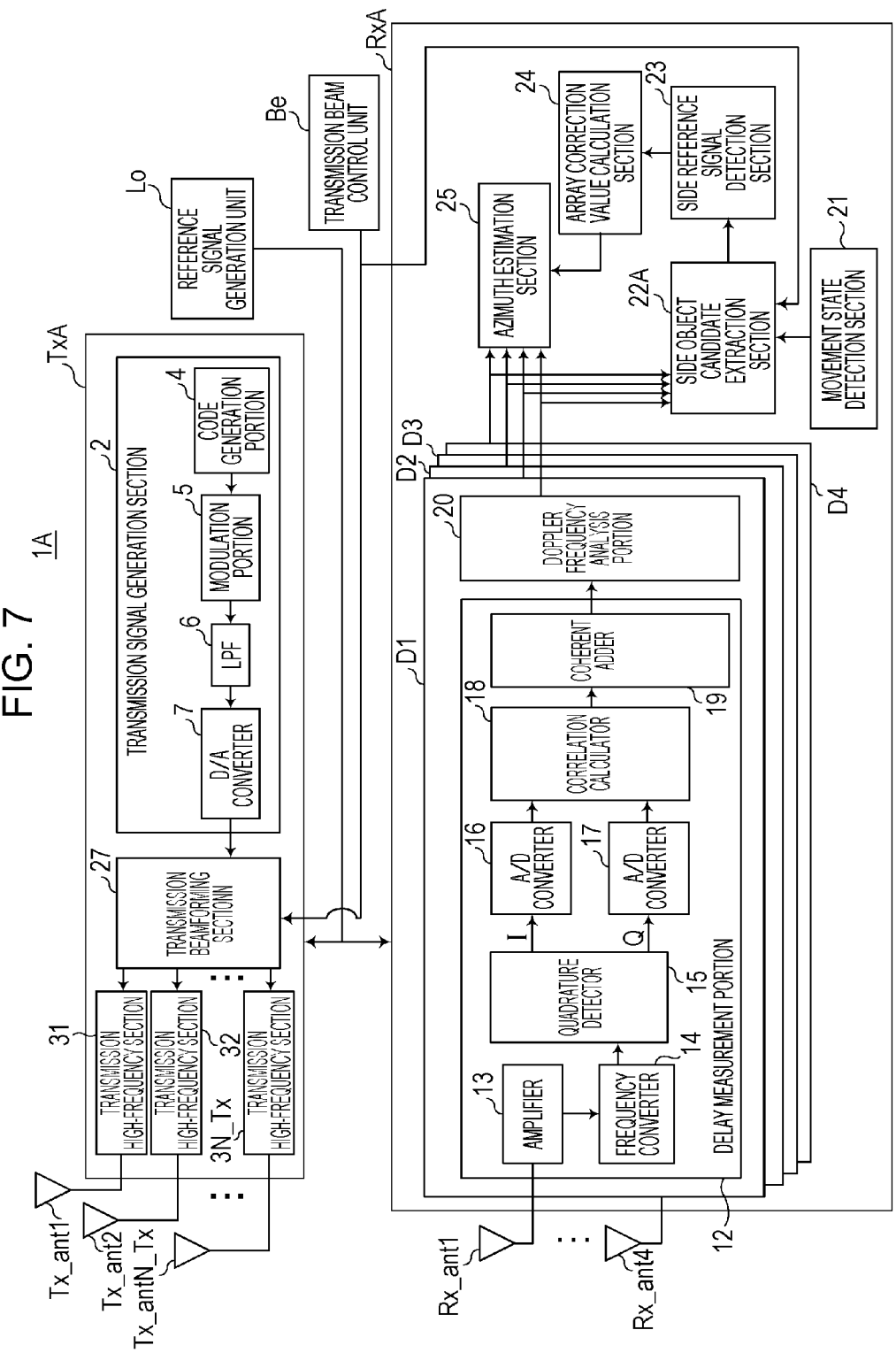
FIG. 7 is a diagram illustrating the internal configuration of a radar apparatus according to a second embodiment in detail.

FIG. 7 is a diagram illustrating the internal configuration of the radar apparatus 1A according to the second embodiment. The radar apparatus 1A illustrated in FIG. 7 includes the reference signal generation unit Lo, a transmission beam control unit Be, the radar transmission unit TxA, and a radar reception unit RxA. Description of the radar apparatus 1A according to this embodiment that is the same as description of the radar apparatus 1 according to the first embodiment is simplified or omitted, and differences will be mainly described.

The radar transmission unit TxA includes the transmission signal generation section 2, a transmission beamforming section 27, and N_Tx transmission high-frequency sections 31, 32, . . . , and 3N_Tx. The transmission high-frequency sections 31, 32, . . . , and 3N_Tx are connected to transmission antennas Tx_ant1, Tx_ant2, . . . , and Tx_antN_Tx, respectively.

In the radar apparatus 1A according to this embodiment, the radar transmission unit TxA transmits a radar transmission signal whose main beam direction has been switched using a beamforming technique, and the radar reception unit RxA calculates, if the main beam direction of the radar transmission signal is a side of the vehicle CR, the correction correlation vectors $h\_{after\_cal}(k, f_s, w)$ for correcting the amplitude and phase deviations between the outputs (correlation vectors) of the antenna system processing sections D1 to D4 using reflection signals received by the reception antennas Rx_ant1 to Rx_ant4.

The transmission beam control unit Be controls a main beam direction $\theta_{Tx}$ of radar transmission signal transmitted by the radar transmission unit TxA. More specifically, the transmission beam control unit Be switches the main beam direction $\theta_{Tx}$ of the radar transmission signal in each of Np×Nc transmission periods Tr at certain intervals $\Delta\theta_{Tx}$ within the same range as the estimated range of the directions of arrival of reflection signals.

In the m-th one of the Np×Nc transmission periods Tr (=Np×Nc×Tr), the transmission beam control unit Be outputs a control signal for determining the main beam direction of radar transmission signals as $\theta_{Tx}(m)$ to the transmission beamforming section 27 and a side object candidate extraction section 22A.

The transmission beamforming section 27 forms transmission beams having the main beam direction $\theta_{Tx}$ according to the control signal output from the transmission beam control unit Be on the basis of the transmission signals r(k, M), which are the outputs of the D/A converter 7.

More specifically, the transmission beamforming section 27 multiplies the transmission signals r(k, M), which are the outputs of the D/A converter 7, by weighting coefficients WTx(Index_Tx, $\theta_{Tx}(m)$) having first to N_Tx-th elements, respectively. If the transmission antennas Tx_ant1 to Tx_antN_Tx are arranged at equal intervals and the intervals are d (refer to FIG. 6), the weighting coefficients WTx (Index_Tx, $\theta_{Tx}(m)$) are represented by Expression (29). $\lambda$ denotes the wavelength of a radar transmission signal. Although the antennas are arranged in a line in the above description, the arrangement of the antennas is not limited to this. Even if the antennas are arranged in a circle or an ellipse, the weighting coefficients may be adjusted to values according to the arrangement and applied.

[Math. 29]

$$WTx(Index\_Tx, \theta_{Tx}(m)) = \exp[j2\pi((index\_Tx)-1)d \sin \theta T_x(m)/\lambda] \quad (29)$$

The transmission beamforming section 27 outputs the N_Tx transmission signals that have been multiplied by the weighting coefficients having the N_Tx elements to the transmission high-frequency sections 31 to 3N_Tx that match the ordinal numbers (Index_Tx) of the elements of the weighting coefficients. Index_Tx is an integer ranging from 1 to N_Nx.

The transmission beamforming section 27 may reduce sidelobes of radar transmission signals by forming the radar transmission signals whose main beam direction is $\theta_{Tx}$ using weighting coefficients including amplitude and phase components. As a beamforming method for reducing sidelobes, for example, binominal array, Chebyshev array, or Taylor array may be applied.

The transmission beamforming section 27 may use transmission antennas Tx_ant1, Tx_ant2, . . . , and Tx_antN_Tx having different main beam directions $\theta_{Tx}$ to select one of types of connection of these antennas, instead. This produces the same advantageous effects.

The transmission high-frequency sections 31 to 3N_Tx generate transmission reference signals in the carrier frequency band by multiplying the reference signal generated by the reference signal generation unit Lo by a certain value. The transmission high-frequency sections 31 to 3N_Tx operate on the basis of the transmission reference signals.

An Index_Tx-th transmission high-frequency section upconverts a baseband transmission signal using the transmission signal that has been multiplied by the weighting coefficient WTx(Index_Tx, $\theta_{Tx}$(m)) and the transmission reference signal to generate a high-frequency radar transmission signal.

The Index_Tx-th transmission high-frequency section amplifies the signal level of the radar transmission signal to a certain signal level and outputs the radar transmission signal to the transmission antenna connected thereto. An Index_Tx-th transmission antenna radiates the radar transmission signal into the air. When N_Tx radar transmission signals transmitted from the N_Tx transmission antennas are spatially combined with one another, a radar transmission signal having the main beam direction $\theta_{Tx}$ is formed.

If the main beam direction $\theta_{Tx}$ of the radar transmission signal is the left direction or the right direction of the vehicle CR ($\theta_{Tx}=-\gamma$) in accordance with the control signal output from the transmission beam control unit Be, the side object candidate extraction section 22A operates in the same manner as the side object candidate extraction section 22 according to the first embodiment.

Thus, if the transmission beam control unit Be switches the main beam direction $\theta_{Tx}$ of the radar transmission signal for each of the Np×Nc transmission periods Tr and the main beam direction $\theta_{Tx}$ of the radar transmission signal becomes the left direction or the right direction of the vehicle CR, the radar apparatus 1A according to this embodiment calculates reception array responses corresponding to a candidate for a static target located in the left direction or the right direction of the vehicle CR using reflection signals received by the reception antennas Rx_ant1 to Rx_ant4.

As a result, even if a movement vector component of a moving target located in a direction other than the left direction and the right direction of the vehicle CR cancels a movement component generated by the movement of the vehicle CR, the radar apparatus 1A can suppress a reflection signal from the moving target because of a spatial filtering effect of a radar transmission beam whose directivity is focused into the left direction and the right direction of the vehicle CR. Therefore, the accuracy of extracting reception array responses corresponding to a candidate for a static target located in the left direction or the right direction of the vehicle CR can be improved.

Third Embodiment

Figure 9B:
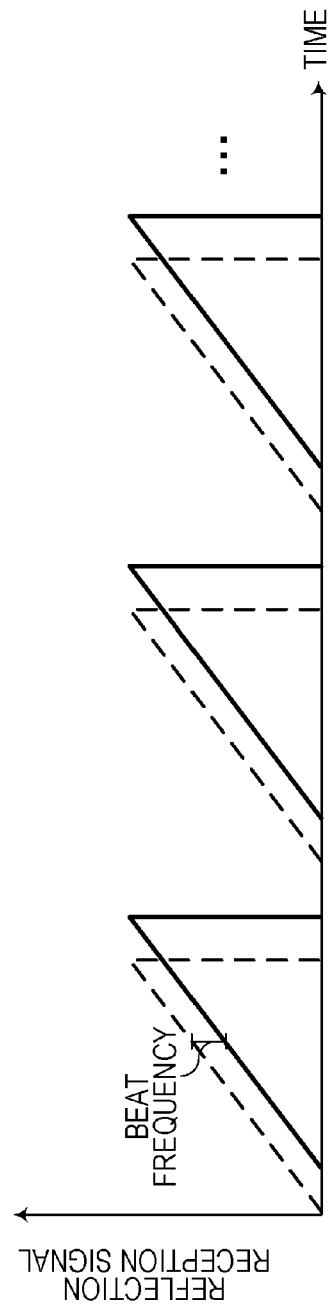

In a third embodiment, a radar apparatus 1B that repeatedly transmits a radar transmission signal (for example, chirped pulses of a frequency-modulated continuous wave (FMCM)) subjected to frequency modulation performed by a radar transmission unit TxB will be described with reference to FIGS. 8, 9A, and 9B.

FIG. 8 is a diagram illustrating the internal configuration of the radar apparatus 1B according to the third embodiment in detail. FIG. 9A is a diagram illustrating a relationship between a frequency-modulated transmission signal and transmission periods. FIG. 9B is a diagram illustrating a reflection reception signal, which is the frequency-modulated transmission signal illustrated in FIG. 9A reflected from a static target or a moving target. Description of the radar apparatus 1B according to this embodiment that is the same as description of the radar apparatus 1 according to the first embodiment is simplified or omitted, and differences will be mainly described.

The radar apparatus 1B illustrated in FIG. 8 includes the reference signal generation unit Lo, the radar transmission unit TxB, and a radar reception unit RxB. The radar transmission unit TxB includes a transmission signal generation section 2B including a modulation signal generator 51 and a voltage control oscillator (VCO) 52, the frequency converter 8, the amplifier 9, and a transmission high-frequency section 3B including a directional coupler 53 connected to the transmission antenna Tx_ant1.

The antenna system processing section D1 of the radar reception unit RxB includes a delay measurement portion 12B connected to the reception antenna Rx_ant1 and a Doppler frequency analysis portion 20B. The delay measurement portion 12B includes a mixer 41, an LPF 42, which is an example of a filter, the A/D converter 16, and a fast Fourier transformer 43.

Next, the operations of the components of the radar transmission unit TxB will be described in detail.

The modulation signal generator 51 generates a serrated modulation signal (refer to FIG. 9A) in each transmission period Tchirp and outputs the generated modulation signal to the VCO 52.

The VCO 52 modulates the frequency of the modulation signal generated by the modulation signal generator 51 to generate a radar transmission signal and outputs the radar transmission signal to the frequency converter 8.

The directional coupler 53 outputs part of the radar transmission signal whose power has been amplified by the amplifier 9 to the mixer 41 of the delay measurement portion 12B of the radar reception unit RxB and transmits the rest of the radar transmission signal from the transmission antenna Tx_ant1.

Next, the operations of the components of the radar reception unit RxB will be described in detail.

In the delay measurement portion 12B, the mixer 41 mixes a reflection signal received by the reception antenna Rx_ant1 and the radar transmission signal output from the directional coupler 53 and transmits a resultant correlation signal through the LPF 42. Thus, the reflection signal and the radar transmission signal are subjected to a correlation process, and the correlation signal (refer to FIG. 9B) including a beat frequency according to a reception delay (arrival delay) of the reflection signal is output to the A/D converter 16.

In the delay measurement portion 12B, the fast Fourier transformer 43 obtains a frequency spectrum response (coherent addition result) Cl_chirp($f_b$, m) of the correlation signal by performing an FFT using Ndata discrete sample values of the correlation signal obtained from the A/D converter 16 in each transmission period Tchirp. The frequency spectrum response (coherent addition result) Cl_chirp($f_b$, m) of the correlation signal can detect a beam frequency component according to the reception delay (arrival delay) of the reflection signal included in the correlation signal.

That is, the fast Fourier transformer 43 performs an FFT on the correlation signal obtained as a result of the correlation process performed by the mixer 41 and the LPF 42 and outputs a correlation signal including reception delay (arrival delay) information associated with a beat frequency component $f_b$. Here, m denotes an ordinal number of the transmission period Tchirp, and $f_b$ denotes a frequency bin number in the FFT performed by the fast Fourier transformer 43. $f_b$=1 to Ndata/2.

The Doppler frequency analysis portion 20B performs coherent additions (refer to Expression (31)) on frequency spectrum responses (coherent addition results) CI_chirp($f_b$, Nc(w−1)+1) to CI_chirp($f_b$, Nc×w), which are Nc outputs of the fast Fourier transformer 43 obtained at each beat frequency $f_b$, using phase variation according to 2Nf different Doppler frequencies $f_s\Delta\theta$ as correction coefficients $\epsilon(f_s)$ (refer to Expression (30)). The Doppler frequency analysis portion 20B outputs the results of Nc coherent additions to the side object candidate extraction section 22 and the azimuth estimation section 25.

[Math. 30]
$$\varepsilon(f_s) = 2\pi f_s (Tchirp)\Delta\theta \quad (30)$$

[Math. 31]
$$FT\_CI^{Nant}(f_b, f_s, w) = \qquad (31)$$
$$\sum_{q=1}^{Nc} CI\_chirp^{Nant}(f_b, Nc(w-1)+q)\exp[-jq\theta(f_s)] =$$
$$\sum_{q=1}^{Nc} CI\_chirp^{Nant}(f_b, Nc(w-1)+q)\exp[-jq2\pi f_s Tchirp]$$

FT_CI$^{Nant}$($f_b$, $f_s$, w) denotes a w-th output of the Doppler frequency analysis portion 20B, which is a coherent addition result of the Nant-th antenna system processing section according to the Doppler frequency $f_s\Delta\theta$ at each beat frequency $f_b$. $f_s$ is −Nf+1, . . . , 0, . . . , Nf. j is an imaginary number. $\Delta\theta$ serves as a phase shift unit (a certain value).

Thus, as a result of the calculation in Expression (31), the antenna system processing sections D1 to D4 can obtain FT_CI$^{Nant}$($f_b$, −Nf+1, w) to FT_CI$^{Nant}$($f_b$, Nf, w), which are coherent addition results in each of the Nc transmission periods Tchirp (Tchirp×Nc) according to the 2Nf Doppler frequencies $f_s\Delta\theta$ at each beat frequency $f_b$.

The operations of the side object candidate extraction section 22, the side reference signal detection section 23, the array correction value calculation section 24, and the azimuth estimation section 25 provided in later stages of the antenna system processing sections D1 to D4 are obtained by replacing the discrete time k with the beat frequency $f_b$.

Thus, the radar apparatus 1B according to this embodiment can produce the same advantageous effects as those produced by the radar apparatus 1 according to the first embodiment, even though the radar transmission unit TxB transmits a radar transmission signal (for example, chirped pulses) subjected to frequency modulation.

Fourth Embodiment

In the first to third embodiments, the radar apparatuses 1, 1A, and 1B correct amplitude and phase deviations between the antenna system processing sections D1, D2, D3, and D4 using the correction correlation vectors h_$_{after\_cal}$(k, $f_s$, w) calculated by the array correction value calculation section 24 on an assumption that the mounting angles γ of the radar apparatuses 1, 1A, and 1B relative to the vehicle CR do not include errors.

In a fourth embodiment, even if the mounting angle γ of a radar apparatus 1C relative to the vehicle CR is not negligible, the radar apparatus 1C estimates an error Δγ in the mounting angle γ of the radar apparatus 1C relative to the vehicle CR and corrects the amplitude and phase deviations between the antenna system processing sections D1, D2, D3, and D4, in order to suppress deterioration of the accuracy of correcting reception array responses and deterioration of target direction estimation performance. Therefore, the radar apparatus 1C performs detection using Doppler frequencies included in a reflection signal from a candidate for a static target located at a side (azimuthal angle −γ [rad]) of the vehicle CR or in a forward or backward part of a side of the vehicle CR (hereinafter referred to as a side forward/backward direction) detected by a side and side forward/backward object candidate extraction section 22C and a side and side forward/backward reference signal detection section 23C. Furthermore, a mounting axis correction and array correction value calculation section 24C estimates the error Δγ in the mounting angle γ of the radar apparatus 1C relative to the vehicle CR and corrects the amplitude and phase deviations between the antenna system processing sections D1, D2, D3, and D4. These operations will be described hereinafter.

Figure 10:
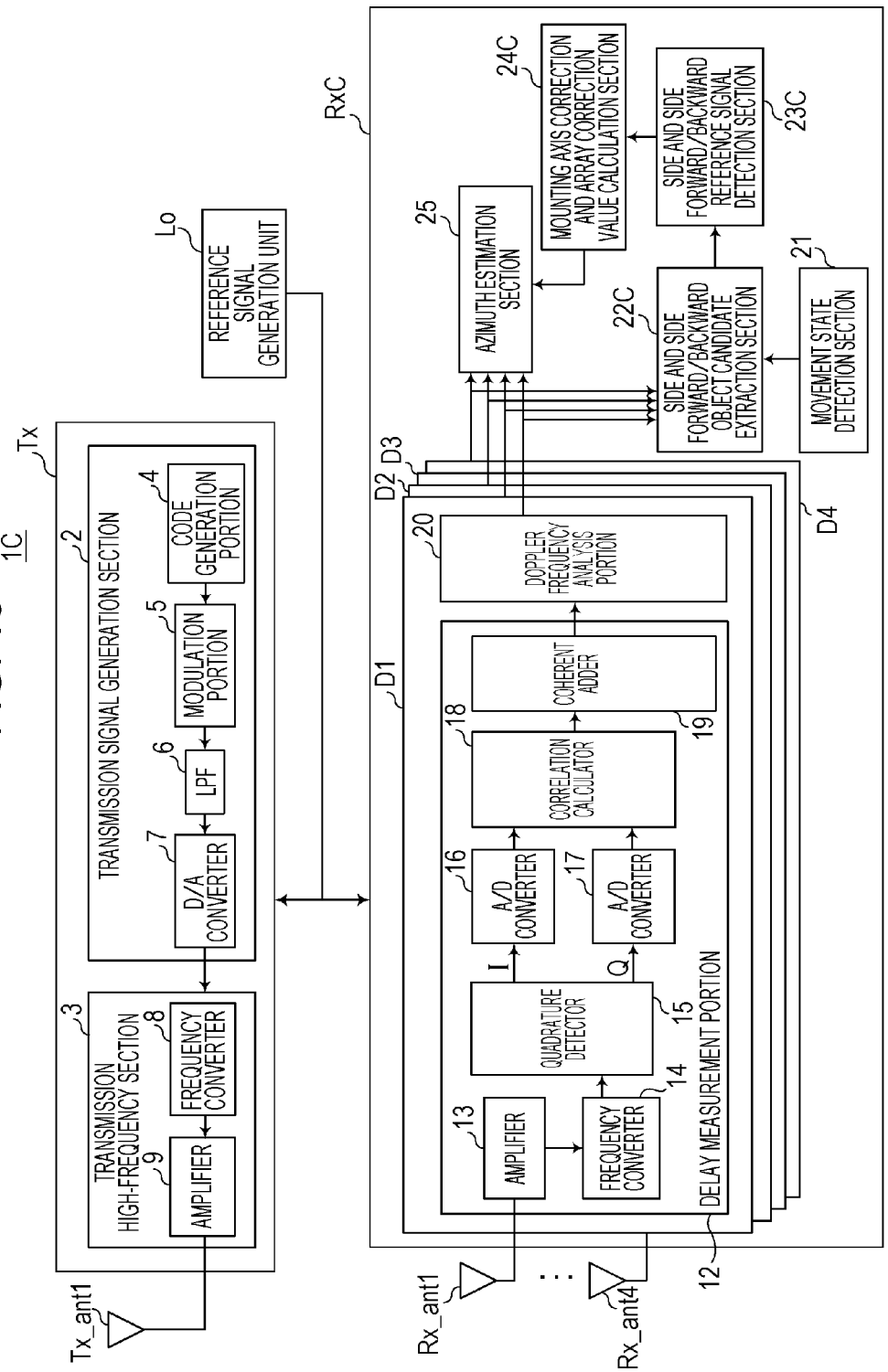
FIG. 10 is a diagram illustrating the internal configuration of a radar apparatus according to a fourth embodiment in detail.

FIG. 10 is a diagram illustrating the internal configuration of the radar apparatus 1C according to the fourth embodiment in detail. The radar apparatus 1C illustrated in FIG. 10 includes the reference signal generation unit Lo, the radar transmission unit Tx, and a radar reception unit RxC. Description of the radar apparatus 1C according to this embodiment that is the same as description of the radar apparatus 1 according to the first embodiment is simplified or omitted, and differences will be mainly described.

The radar reception unit RxC includes the four antenna system processing sections D1 to D4 (the antenna system processing sections D1 to D4 will be described hereinafter since four antenna system processing sections are illustrated in FIG. 10, but the number of antenna system processing sections is not limited to four) provided in accordance with the number (for example, four in FIG. 10) of reception antennas included in an array antenna, the movement state detection section 21, the side and side forward/backward object candidate extraction section 22C, the side and side forward/backward reference signal detection section 23C, the mounting axis correction and array correction value calculation section 24C, and the azimuth estimation section 25.

The side and side forward/backward object candidate extraction section 22C and the side and side forward/backward reference signal detection section 23C perform the following processes (1) and (2).

Process (1)

The side and side forward/backward object candidate extraction section 22C, which is an example of a static target candidate extractor, determines, using the vehicle speed vector detection values (Vs [m/s] and Vb [m/s]) of the vehicle CR calculated by the movement state detection section 21, whether the vehicle CR is moving straight ahead. For example, if the speed component Vs of the vehicle CR in the forward direction is equal to or larger than a certain value and the speed component Vb of the vehicle CR in the lateral direction is zero or negligibly small, the side and side forward/backward object candidate extraction section 22C determines that the vehicle CR is moving straight ahead.

Furthermore, if the vehicle CR is moving straight ahead, the side and side forward/backward object candidate extraction section 22C extracts the reception array responses h_static(k_static, 0, w) corresponding to a candidate for a static target (refer to Expression (32)).

Here, since the Doppler frequency of a reflection signal from a static target located at a side of the vehicle CR is zero and an azimuth detected by each of the reception antennas Rx_ant1 to Rx_ant4 is −(γ+Δγ) [rad], the side and side forward/backward object candidate extraction section 22C can extract a candidate for a static target.

The side and side forward/backward object candidate extraction section 22C extracts, from among the outputs (correlation vectors h(k, $f_s$, w)) of the antenna system processing sections D1 to D4 in the w-th one of the (Np×Nc) transmission periods Tr, correlation vectors h(k, 0, w) whose indices ($f_s$) of the Doppler frequency $f_s\Delta\theta$ are zero and whose norms are larger than a certain value Lev_static as a candidate for a static target.

k_static denotes, among 0 to (Nr+Nu)Ns/No−1, discrete times that satisfy Expression (32). w is an integer equal to or larger than 1 and denotes the number of times that the (Np×Nc) transmission periods Tr have been repeated.

Instead of the norms of the correlation vectors indicated in Expression (32), squares of the norms of the correlation vectors, the amplitude of a certain component of the correlation vectors, or squares of the amplitude of the certain component of the correlation vectors may be used.

[Math. 32]

$$\|h(k\_static, 0, w)\| > Lev\_static \quad (32)$$

Here, if the vehicle CR is moving straight ahead, the Doppler frequency of a reflection signal from a static target located on side of the vehicle CR is zero, and an azimuth detected by each of the reception antennas Rx_ant1 to Rx_ant4 is −(γ+Δγ) [rad]. However, even if the vehicle CR is moving straight ahead, for example, a movement vector component of a moving target located in a direction other than a side of the vehicle CR might be canceling a movement component caused by the movement of the vehicle CR. Therefore, a reflection signal from a static target located at a side of the vehicle CR and a reflection signal from a moving target need to be distinguished.

Therefore, the side and side forward/backward reference signal detection section 23C, which is an example of a reference signal detector, detects, through a certain calculation process, consistency between reception array responses h_static(k_static, 0, w) corresponding to a candidate for a static target extracted by the side and side forward/backward object candidate extraction section 22C at once or consistency between reception array responses h_static(k_static, 0, w) corresponding to a candidate for a static target extracted by the side and side forward/backward object candidate extraction section 22C over a plurality of times. By performing the same calculation process as that performed by the side reference signal detection section 23 according to the first embodiment, the side and side forward/backward reference signal detection section 23C determines reception array responses whose consistency is high as reflection wave signals from a static target located at a side of the vehicle CR. The side and side forward/backward reference signal detection section 23C then outputs the reflection wave signals to the mounting axis correction and array correction value calculation section 24C as vehicle side reference signals h_ref(0).

Process (2)

If the vehicle CR is moving straight ahead, the side and side forward/backward object candidate extraction section 22C extracts, from among the outputs (correlation vectors h(k, $f_s$, w)) of the antenna system processing sections D1 to D4 in the w-th one of the (Np×Nc) transmission periods Tr, correlation vectors h(k, $f_{s\_st}$, w) at the Doppler frequency $f_s\Delta\theta$ whose norms are larger than a certain value Lev_sta as reception array responses h_sta(k_sta, $f_{s\_sta}$, w) corresponding to a candidate for a static target located in a forward/backward part of a side of the vehicle CR.

Here, the Doppler frequency $f_s\Delta\theta$ is not zero (that is, $f_{s\_sta} \ne 0$). k_sta denotes, among 0 to (Nr+Nu)Ns/No−1, discrete times that satisfy Expression (33). w is an integer equal to or larger than 1 and denotes the number of times that the (Np×Nc) transmission periods Tr have been repeated.

[Math. 33]

$$\|h(k\_sta, f_{s\_st}, w)\| > Lev\_sta \quad (33)$$

Furthermore, if the vehicle CR is moving straight ahead, the side and side forward/backward object candidate extraction section 22C converts the Doppler frequency $f_{s\_st}\Delta\theta$ into an azimuthal angle $\phi(f_{s\_st})$ at which a static target is located using the outputs (vehicle speed vector detection values) of the movement state detection section 21, in order to extract reception array responses corresponding to a candidate for a static target located in the forward/backward part of a side of the vehicle CR (refer to Expression (34)). The side and side forward/backward object candidate extraction section 22C then outputs the azimuthal angle $\phi(f_{s\_st})$ to the side and side forward/backward reference signal detection section 23C. In Expression (34), λ denotes the wavelength of the radar transmission signal transmitted from the transmission high-frequency section 3 in the carrier frequency band.

[Math. 34]

$$\phi(f_{s\_st}) = \arcsin\left[\frac{\lambda}{2} f_{s\_st}\Delta\theta / V_S\right] - \gamma \quad (34)$$

However, for example, even if the vehicle CR is moving straight ahead and the Doppler frequency of the reflection signal is $f_{s\_st}\Delta\theta$, deviations in the Doppler frequency of the reflection signal might be $f_s\Delta\theta$ because a movement vector component of a moving target might be offsetting part of a movement component caused by the movement of the vehicle CR. Therefore, a reflection signal from a static target located in the forward/backward part of a side of the vehicle CR and a reflection signal from a moving target need to be distinguished.

Therefore, the side and side forward/backward reference signal detection section 23C detects, through a certain calculation process, consistency between reception array responses h_sta(k_sta, $f_{s\_st}$, w) whose Doppler frequencies are $f_{s\_st}\Delta\theta$ and that correspond to a candidate for a static target extracted by the side and side forward/backward object candidate extraction section 22C at once or consistency between reception array responses h_sta(k_sta, $f_{s\_st}$, w) corresponding to a candidate for a static target extracted by the side and side forward/backward object candidate extraction section 22C over a plurality of times.

That is, as with the side reference signal detection section 23 according to the first embodiment, the side and side forward/backward reference signal detection section 23C determines reception array responses whose consistency is high as reflection wave signals from a static target located in the forward/backward part of a side of the vehicle CR. The side and side forward/backward reference signal detection section 23C then outputs the reflection wave signals to the mounting axis correction and array correction value calculation section 24C as vehicle forward/backward reference signals h_ref($f_{s\_st}$).

Next, the mounting axis correction and array correction value calculation section 24C, which is an example of a correction value calculator, holds the direction vector $a(\theta_u)$ represented by Expression (16) and calculates evaluation function values EVA($\Delta\gamma$), which are represented by Expression (35), having the error $\Delta\gamma$ in the mounting angle $\gamma$ as a parameter using the elements h_ref$_{[nn]}$ of the vehicle side reference signals h_ref indicated by a column vector and elements h_ref($f_{s\_st})_{[nn]}$ of the vehicle forward/backward reference signals h_ref($f_{s\_st}$) at the azimuth $\phi(f_{s\_st})$ indicated by a column vector. The mounting axis correction and array correction value calculation section 24C determines, by varying the error $\Delta\gamma$ in the mounting angle $\gamma$, an error $\Delta\gamma$ in the mounting angle $\gamma$ with which a minimum evaluation function value EVA(Ay) is obtained as an estimated value of the error Ay in the mounting angle $\gamma$. Nant ranges from 1 to Na.

[Math. 35]

$$EVA(\Delta\gamma) = \sum_{Nant=2}^{N\_Rx} \left| \frac{\text{h\_ref}(f_{s\_st})_{[Nant]}}{\text{h\_ref}(f_{s\_st})_{[1]} a(-(\gamma+\Delta\gamma)+\phi(f_{s\_st}))_{[Nant]}} - \frac{\text{h\_ref}(0)_{[Nant]}}{\text{h\_ref}(0)_{[1]} a(-(\gamma+\Delta\gamma))_{[Nant]}} \right|^2 \quad (35)$$

The mounting axis correction and array correction value calculation section 24C calculates the array correction values h_cal[nn] using the estimated value of the error $\Delta\gamma$ in the mounting angle $\gamma$, the elements h_ref$_{[nn]}$ of the vehicle side reference signals h_ref(0) indicated by a column vector, and elements $a(-(\gamma+\Delta\gamma))_{[nn]}$ of the direction vectors $a(-(\gamma+\Delta\gamma))$ (refer to Expression (36)). The mounting axis correction and array correction value calculation section 24C then outputs the array correction values h_cal[nn] to the azimuth estimation section 25.

[Math. 36]

$$h\_cal_{[nn]} = a(-(\gamma+\Delta\gamma))_{[nn]} / h\_ref_{[nn]} \quad (36)$$

Figure 11:
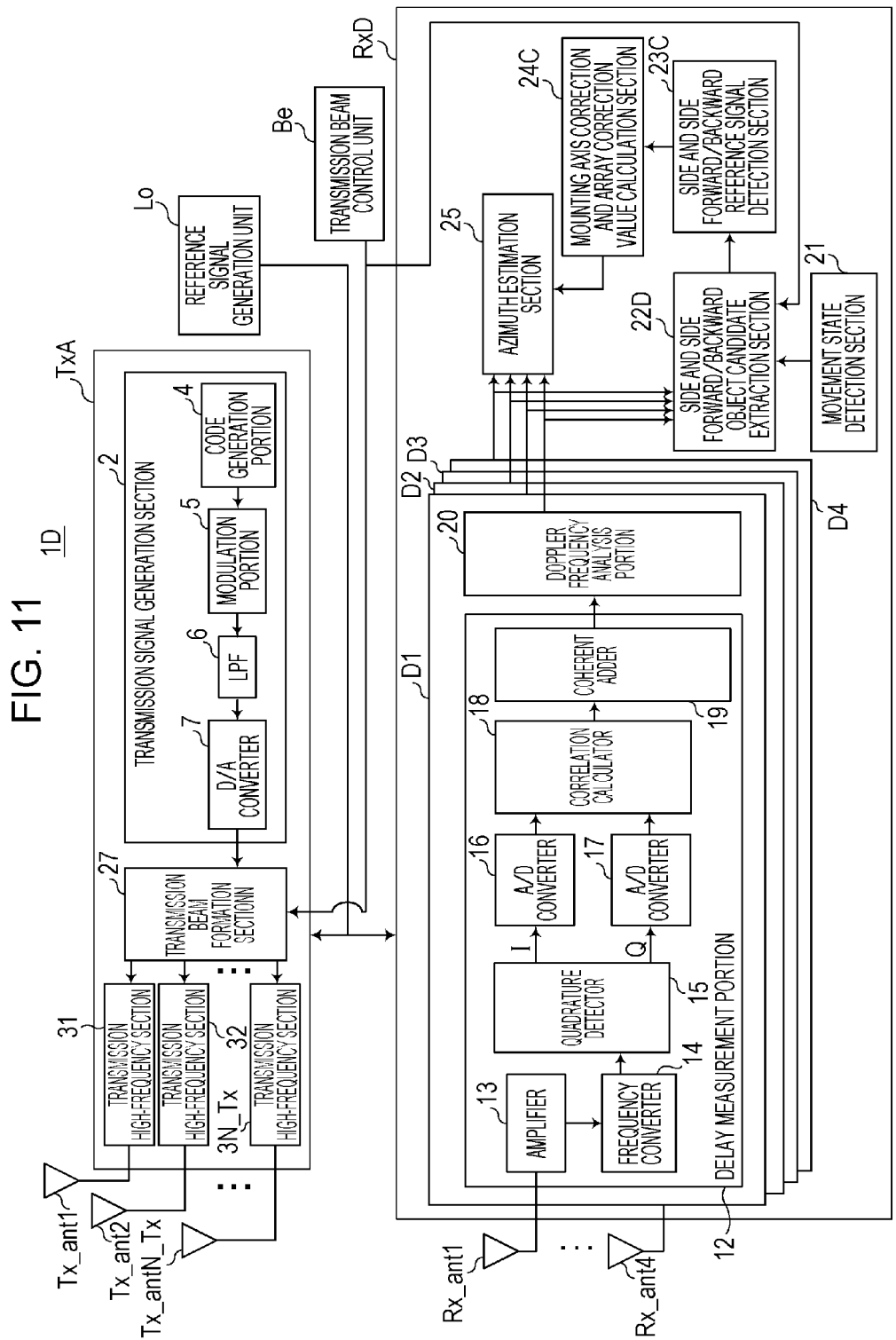
FIG. 11 is a diagram illustrating the internal configuration of a radar apparatus according to a modification of the fourth embodiment in detail.

The radar transmission unit Tx of the radar apparatus 1C according to this embodiment may be replaced by the radar transmission unit TxA illustrated in FIG. 7 (refer to FIG. 11). FIG. 11 is a diagram illustrating the internal configuration of a radar apparatus according to a modification of the fourth embodiment in detail. A radar apparatus 1D illustrated in FIG. 11 can produce not only the same advantageous effects as those produced by the radar apparatus 1A according to the second embodiment but also the same advantageous effects as those produced by the radar apparatus 1C according to the fourth embodiment.

In order to prevent the mounting axis correction from being frequently updated due to small changes in the estimated value of the error $\Delta\gamma$ in the mounting angle $\gamma$, the mounting axis correction and array correction value calculation section 24C may update the mounting axis correction only if the estimated value changes by a certain angle or more (for example, 0.5 degree or more). Alternatively, the mounting axis correction and array correction value calculation section 24C may update the mounting axis correction using, as indicated in Expression (39), an estimated average value obtained by averaging estimated values of the error $\Delta\gamma$ in the mounting angle $\gamma$ using a forgetting coefficient $\rho$.

[Math. 39]

Average estimated value of error $\Delta\gamma$ in mounting angle $\gamma = (1-\rho) \times$ (currently calculated estimated value of error $\Delta\gamma$ in mounting angle $\gamma$) $+\rho \times$ (previously calculated average estimated value of error $\Delta\gamma$ in mounting angle $\gamma$) (39)

Alternatively, in order to prevent the mounting axis correction from being frequently updated due to small changes in the estimated value of the error $\Delta\gamma$ in the mounting angle $\gamma$, the mounting axis correction and array correction value calculation section 24C may accumulate estimated values of the error $\Delta\gamma$ in the mounting angle $\gamma$ for a sufficiently long time and obtain the statistical distribution of the estimated values. The mounting axis correction and array correction value calculation section 24C may then update the mounting axis correction using an estimated statistical value, which is a median or an average of the statistical distribution.

Alternatively, a notification section may be provided in a later stage (not illustrated) of the mounting axis correction and array correction value calculation section 24C. If an estimated value of the error $\Delta\gamma$ in the mounting angle $\gamma$ calculated by the mounting axis correction and array correction value calculation section 24C is larger than an estimated range of errors, the radar apparatus may notify a driver of the vehicle on which the radar apparatus is mounted that the estimated value is outside the predetermined range. As a result, the driver of the vehicle on which the radar apparatus is mounted can immediately learn a change in the radar apparatus.

Alternatively, the side and side forward/backward object candidate extraction section 22C may extract reception array responses corresponding to azimuthal angles $\phi(f_{s\_st1})$ and $\phi(f_{s\_st2})$ of a plurality of (for example, two or more) Doppler frequencies $f_{s\_st1}$ and $f_{s\_st2}$ as the forward/backward part of a side of the vehicle CR in which a static target is located. The side and side forward/backward reference signal detection section 23C may detect vehicle forward/backward reference signals h_ref($f_{s\_st1}$) and h_ref($f_{s\_st2}$) corresponding to the azimuthal angles $\phi(f_{s\_st1})$ and $\phi(f_{s\_st2})$. The mounting axis correction and array correction value calculation section 24C may calculate the error $\Delta\gamma$ in the mounting angle $\gamma$ on the basis of a minimum evaluation function value EVA($\Delta\gamma$) represented by Expression (37). As a result, the radar apparatus 1C can improve the accuracy of estimating the error $\Delta\gamma$ in the mounting angle $\gamma$ of the radar apparatus 1C relative to the vehicle CR.

[Math. 37]

$$EVA(\Delta\gamma) = \sum_{nst=1}^{2} \sum_{Nant=2}^{N\_Rx} \left| \frac{\text{h\_ref}(f_{s\_st(nst)})_{[Nant]}}{\text{h\_ref}(f_{s\_st(nst)})_{[1]} a(-(\gamma+\Delta\gamma)+\phi(f_{s\_st(nst)}))_{[Nant]}} - \frac{\text{h\_ref}(0)_{[Nant]}}{\text{h\_ref}(0)_{[1]} a(-(\gamma+\Delta\gamma))_{[Nant]}} \right|^2 \quad (37)$$

Alternatively, the side and side forward/backward object candidate extraction section 22C may extract, using $f_{s\_st}$ and a sign-inverted $-f_{s\_st}$ as a plurality of (for example, two or more) Doppler frequencies, reception array responses corresponding to azimuthal angles $\phi(f_{s\_st})$ and $\phi(-f_{s\_st})$ at Doppler frequencies $f_{s\_st}$ and $-f_{s\_st}$ in the forward/backward part of a side of the vehicle CR in which a static target is located. The side and side forward/backward reference signal detection section 23C may detect vehicle forward/backward reference signals h_ref($f_{s\_st}$) and h_ref($-f_{s\_st}$) corresponding to the azimuthal angles $\phi(f_{s\_st})$ and $\phi(-f_{s\_st})$. The mounting axis correction and array correction value calculation section 24C may calculate the error $\Delta\gamma$ in the mounting angle $\gamma$ on the basis of a minimum evaluation function value EVA($\Delta\gamma$) represented by Expression (38). As a result, due to the positive-negative symmetry of Doppler frequency, the radar apparatus 1C can reduce error components of the azimuthal angles $\phi(f_{s\_st})$ and $\phi(-f_{s\_st})$ and improve the accuracy of estimating the error $\Delta\gamma$ in the mounting angle $\gamma$ of the radar apparatus 1C relative to the vehicle CR.

[Math. 38]

$$EVA(\Delta\gamma) = \sum_{Nant=2}^{N\_Rx} \left| \frac{1}{2} \left\{ \frac{\text{h\_ref}(f_{s\_st})_{[Nant]}}{\text{h\_ref}(f_{s\_st})_{[1]} a(-(\gamma+\Delta\gamma)+\phi(f_{s\_st}))_{[Nant]}} + \frac{\text{h\_ref}(-f_{s\_st})_{[Nant]}}{\text{h\_ref}(-f_{s\_st})_{[1]} a(-(\gamma+\Delta\gamma)+\phi(-f_{s\_st}))_{[Nant]}} \right\} - \frac{\text{h\_ref}(0)_{[Nant]}}{\text{h\_ref}(0)_{[1]} a(-(\gamma+\Delta\gamma))_{[Nant]}} \right|^2 \quad (38)$$

In addition, if the minimum evaluation function value EVA($\Delta\gamma$) of the error $\Delta\gamma$ in the mounting angle $\gamma$ is larger than a certain value, the mounting axis correction and array correction value calculation section 24C may determine that the reliability of results of detection of vehicle side reference signals and vehicle forward/backward reference signals is low, and the radar apparatus 1C according to this embodiment need not update the array correction values represented by Expression (36). As a result, if the detection of vehicle side reference signals and vehicle forward/backward reference signals is erroneous, the radar apparatus 1C can omit update of the array correction values represented by Expression (36) and suppress deterioration of the accuracy of estimating the azimuth of an object using, for example, previously calculated array correction values.

Various aspects of the embodiments according to the present disclosure include the following.

A radar apparatus according to a first aspect is a radar apparatus mounted on a moving body. The radar apparatus includes a radar transmitter that transmits a high-frequency radar transmission signal from a transmission antenna, and a radar receiver that receives a reflection signal, which is the radar transmission signal reflected from a static target or a moving target, using a plurality of reception antennas. The radar receiver includes a plurality of antenna system processors that each generate, through correlation calculation of the reflection signal and the radar transmission signal, an array correlation signal for each delay in arrival of the reflection signal at each Doppler frequency, a static target candidate extractor that extracts a plurality of array correlation signals corresponding to a candidate for a static target located at a side of the moving body on the basis of outputs of the plurality of antenna system processors and a Doppler frequency of a reflection signal from the static target, a reference signal detector that outputs a reference signal indicating presence of the static target at the side of the moving body on the basis of a correlation between the plurality of array correlation signals corresponding to the candidate for the static target located at the side of the moving body, and a correction value calculator that calculates a correction value for correcting deviations between the plurality of reception antennas using the reference signal and information regarding a mounting angle of the radar apparatus mounted on the moving body.

A radar apparatus according to a second aspect is the radar apparatus according to the first aspect. The static target candidate extractor may extract a plurality of array correlation signals corresponding to the candidate for the static target using the outputs of the plurality of antenna system processors and a reflection signal from the static target located at the side of the moving body, the Doppler frequency of the reflection signal being zero.

A radar apparatus according to a third aspect is the radar apparatus according to the first aspect. The radar receiver may further include an azimuth estimator that calculates an azimuth of the reflection signal using the outputs of the plurality of antenna system processors and the correction value for correcting the deviations between the plurality of reception antennas.

A radar apparatus according to a fourth aspect is the radar apparatus according to the third aspect. The azimuth estimator may estimate a direction of arrival of the reflection signal from the static target or the moving target on the basis of a maximum value of a certain evaluation function value including a correction correlation signal.

A radar apparatus according to a fifth aspect is the radar apparatus according to the third aspect. The azimuthal estimator may calculate a distance between the radar apparatus and the static target or the moving target on the basis of a maximum value of a certain evaluation function value including a correction correlation signal.

A radar apparatus according to a sixth aspect is the radar apparatus according to the first aspect. The radar apparatus may further include a movement state estimator that calculates movement information regarding the moving body.

A radar apparatus according to a seventh aspect is the radar apparatus according to the first aspect. The radar apparatus may further include a transmission beam controller that switches a main beam direction of the radar transmission signal after a certain number of transmission periods. The radar transmitter may transmit the radar transmission signal whose main beam direction has been switched. If the main beam direction of the radar transmission signal is a side of the moving body, the static target candidate extractor may extract a plurality of array correlation signals corresponding to a candidate for a static target.

A radar apparatus according to an eighth aspect is the radar apparatus according to the first aspect. Each of the plurality of antenna system processors may include a correlation calculator that calculates, in each transmission period of the radar transmission signal, a correlation value between the reflection signal received by the corresponding reception antenna and the radar transmission signal, a first coherent adder that performs coherent additions on the correlation value for a first certain number of transmission periods, and a second coherent adder that corrects phase variation according to a certain number of different Doppler frequencies and that performs coherent additions on results of the first certain number of coherent additions for a second certain number of transmission periods.

A radar apparatus according to a ninth aspect is the radar apparatus according to the first aspect. The radar transmitter may transmit, in each transmission period, the radar transmission signal whose transmission code has been subjected to frequency modulation. Each of the plurality of antenna system processors may include a mixer that outputs, in each transmission period, a signal obtained by mixing the reflection signal received by the corresponding reception antenna and the radar transmission signal whose transmission code has been subjected to the frequency modulation, a filter that outputs a low-frequency component of the signal obtained as a result of the mixing, a Fourier transformer that transforms a signal of the low-frequency component into a frequency domain, and a Doppler frequency analyzer that corrects phase variation according to a certain number of different Doppler frequencies and that performs a coherent addition on the signal transformed into the frequency domain for each frequency component.

A radar apparatus according to a tenth aspect is the radar apparatus according to the first aspect. The static target candidate extractor may extract the outputs of the plurality of antenna system processors and a plurality of array correlation signals corresponding to a candidate for a static target located in a forward or backward direction of the moving body. The reference signal detector may output a reference signal regarding the forward or backward direction of the moving body on the basis of a correlation between the plurality of array correlation signals corresponding to the a candidate for the static target. The correction value calculator may estimate, using the reference signal and the information regarding the mounting angle of the radar apparatus mounted on the moving body, an error in the mounting angle included in the information regarding the mounting angle of the radar apparatus and calculate, using the error in the mounting angle, a correction value for correcting the deviations between the plurality of reception antennas.

Although the above embodiments have been described while taking a case in which the present disclosure is configured using hardware as an example, the present disclosure may be realized by software in combination with hardware.

Although various embodiments have been described with reference to the drawings, the present disclosure is obviously not limited to these embodiments. Needless to say, those skilled in the art can conceive various modifications or corrections within the scope defined by the claims, and such modifications or corrections shall be regarded as belonging to the technical scope of the present disclosure. The components according to the above embodiments may be arbitrarily combined with one another without deviating from the scope of the present disclosure.

Each function block used in the description of the above embodiments is realized as large-scale integration (LSI), which is typically an integrated circuit. Each function block may be individually realized as a chip, or part or all of the function blocks may be realized as a chip. Depending on the degree of integration, a term an "integrated circuit (IC)", "system LSI", "super LSI", or "ultra LSI" might be used instead of LSI.

The method for realizing each function block as a chip is not limited to LSI. Each function block may be realized using a dedicated circuit or a general-purpose processor. After LSI is manufactured, a field-programmable gate array (FPGA) or a reconfigurable processor capable of reconfiguring connections or settings of circuit cells inside the LSI may be used.

Further, if an integration technique that replaces LSI is invented as a result of evolution of semiconductor technologies or derivative technologies, each function block may be obviously realized as a chip using the integration technique. Biological techniques might be applied in the future.

The present disclosure is effective as a radar apparatus that detects a reflection signal from an object located at a side of a moving body on the basis of deviations in the Doppler frequency and that suppresses deterioration of the accuracy of correcting amplitude and phase deviations between reception antennas included in an array antenna.

What is claimed is:

1. A radar apparatus mounted on a moving body, the radar apparatus comprising:
   a radar transmitter that transmits a high-frequency radar transmission signal from a transmission antenna; and
   a radar receiver that receives a reflection signal, which is the radar transmission signal reflected from a static target or a moving target, using a plurality of reception antennas,
   wherein the radar receiver includes
   a plurality of antenna system processors that each generate, through correlation calculation of the reflection signal and the radar transmission signal, an array correlation signal for each delay in arrival of the reflection signal at each Doppler frequency,
   a static target candidate extractor that extracts a plurality of array correlation signals corresponding to a candidate for a static target located at a side of the moving body on the basis of outputs of the plurality of antenna system processors and a Doppler frequency of a reflection signal from the static target,
   a reference signal detector that outputs a reference signal indicating presence of the static target at the side of the moving body on the basis of a correlation between the plurality of array correlation signals corresponding to the candidate for the static target located at the side of the moving body, and
   a correction value calculator that calculates a correction value for correcting deviations between the plurality of reception antennas using the reference signal and information regarding a mounting angle of the radar apparatus mounted on the moving body.

2. The radar apparatus according to claim 1,
   wherein the static target candidate extractor extracts a plurality of array correlation signals corresponding to the candidate for the static target using the outputs of the plurality of antenna system processors and a reflection signal from the static target located at the side of the moving body, the Doppler frequency of the reflection signal being zero.

3. The radar apparatus according to claim 1,
   wherein the radar receiver further includes an azimuth estimator that calculates an azimuth of the reflection signal using the outputs of the plurality of antenna system processors and the correction value for correcting the deviations between the plurality of reception antennas.

4. The radar apparatus according to claim 3,
   wherein the azimuth estimator estimates a direction of arrival of the reflection signal from the static target or the moving target on the basis of a maximum value of a certain evaluation function value including a correction correlation signal.

5. The radar apparatus according to claim 3,
   wherein the azimuthal estimator calculates a distance between the radar apparatus and the static target or the moving target on the basis of a maximum value of a certain evaluation function value including a correction correlation signal.

6. The radar apparatus according to claim 1, further comprising:
   a movement state estimator that calculates movement information regarding the moving body.

7. The radar apparatus according to claim 1, further comprising:
- a transmission beam controller that switches a main beam direction of the radar transmission signal after a certain number of transmission periods,
- wherein the radar transmitter transmits the radar transmission signal whose main beam direction has been switched, and
- wherein, if the main beam direction of the radar transmission signal is a side of the moving body, the static target candidate extractor extracts a plurality of array correlation signals corresponding to a candidate for a static target.

8. The radar apparatus according to claim 1,
- wherein each of the plurality of antenna system processors includes
- a correlation calculator that calculates, in each transmission period of the radar transmission signal, a correlation value between the reflection signal received by the corresponding reception antenna and the radar transmission signal,
- a first coherent adder that performs coherent additions on the correlation value for a first certain number of transmission periods, and
- a second coherent adder that corrects phase variation according to a certain number of different Doppler frequencies and that performs coherent additions on results of the first certain number of coherent additions for a second certain number of transmission periods.

9. The radar apparatus according to claim 1,
- wherein the radar transmitter transmits, in each transmission period, the radar transmission signal whose transmission code has been subjected to frequency modulation,
- wherein each of the plurality of antenna system processors includes
- a mixer that outputs, in each transmission period, a signal obtained by mixing the reflection signal received by the corresponding reception antenna and the radar transmission signal whose transmission code has been subjected to the frequency modulation,
- a filter that outputs a low-frequency component of the signal obtained as a result of the mixing,
- a Fourier transformer that transforms a signal of the low-frequency component into a frequency domain, and
- a Doppler frequency analyzer that corrects phase variation according to a certain number of different Doppler frequencies and that performs a coherent addition on the signal transformed into the frequency domain for each frequency component.

10. The radar apparatus according to claim 1,
- wherein the static target candidate extractor extracts the outputs of the plurality of antenna system processors and a plurality of array correlation signals corresponding to a candidate for a static target located in a forward or backward direction of the moving body,
- wherein the reference signal detector outputs a reference signal regarding a forward or backward direction of the moving body on the basis of a correlation between the plurality of array correlation signals corresponding to the candidate for the static target, and
- wherein the correction value calculator estimates, using the reference signal and the information regarding the mounting angle of the radar apparatus mounted on the moving body, an error in the mounting angle included in the information regarding the mounting angle of the radar apparatus and calculates, using the error in the mounting angle, a correction value for correcting the deviations between the plurality of reception antennas.

* * * * *